(12) United States Patent
Search et al.

(10) Patent No.: US 10,619,777 B2
(45) Date of Patent: *Apr. 14, 2020

(54) QUICK CONNECT COUPLING DEVICE FOR USE WITH HOSES AND HOSES INCLUDING QUICK CONNECT COUPLING DEVICE

(71) Applicants: Collin Danis Search, Kennett Square, PA (US); John Danis Search, Kennett Square, PA (US)

(72) Inventors: Collin Danis Search, Kennett Square, PA (US); John Danis Search, Kennett Square, PA (US); David E. Yaeger, Telford, PA (US)

(73) Assignees: Collin Danis Search, Kennett Square, PA (US); John Danis Search, Kennett Square, PA (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/964,750

(22) Filed: Apr. 27, 2018

(65) Prior Publication Data

US 2018/0252346 A1    Sep. 6, 2018

Related U.S. Application Data

(63) Continuation-in-part of application No. 15/427,749, filed on Feb. 8, 2017, now Pat. No. 10,259,619.

(51) Int. Cl.
*F16L 37/05*    (2006.01)
*F16L 37/20*    (2006.01)
(Continued)

(52) U.S. Cl.
CPC ............ *F16L 37/05* (2013.01); *B65D 45/345* (2013.01); *B65D 53/02* (2013.01); *F16L 37/20* (2013.01);
(Continued)

(58) Field of Classification Search
CPC   F16L 33/32; F16L 37/05; F16L 37/48; B65D 41/0485
See application file for complete search history.

(56) References Cited

U.S. PATENT DOCUMENTS 1,946,832 A * 2/1934 Brandon ................. F16L 37/48
                                                           285/8
1,971,438 A    8/1934 Yoder
(Continued)

*Primary Examiner* — Shawn M Braden
(74) *Attorney, Agent, or Firm* — Caesar Rivise, PC

(57) ABSTRACT

A coupling device is provided for mounting onto a faucet having an externally threaded portion terminating in a free end. The device includes a pair clam-shell shaped members pivotably connected to each other to form a housing enclosing a tubular connector member having a connector at one end for connection to a hose. A pair of opposed shoes, a washer and a pressure applying member are located within the housing. An actuator lever is coupled to the clam-shells to pivot them with respect to each other into various positions. In one position the shoes are brought into engagement with the externally threaded end portion to mount the coupling device on the faucet. In another position the pressure applying member moves the tubular connector member into engagement with the washer to compress the washer between it and the free end surface of the faucet to couple the faucet to it in a fluid-tight interface.

20 Claims, 17 Drawing Sheets

(51) Int. Cl.
- F16L 55/115 (2006.01)
- B65D 45/34 (2006.01)
- B65D 53/02 (2006.01)
- F16L 37/48 (2006.01)
- F16L 33/32 (2006.01)
- F16L 33/34 (2006.01)
- F16L 15/00 (2006.01)

(52) U.S. Cl.
CPC ........... F16L 37/48 (2013.01); F16L 55/1157 (2013.01); F16L 15/006 (2013.01); F16L 33/32 (2013.01); F16L 33/34 (2013.01)

(56) References Cited

U.S. PATENT DOCUMENTS

| | | |
|---|---|---|
| 2,449,920 A | 9/1948 | Williams |
| 2,494,774 A * | 1/1950 | Messick .................. F16L 37/48 285/8 |
| 2,816,746 A * | 12/1957 | Botnick .................... E03C 1/08 261/64.1 |
| 4,443,028 A | 4/1984 | Hayes |
| 4,660,803 A | 4/1987 | Johnston et al. |
| 5,028,077 A | 7/1991 | Hurst |
| 5,211,429 A * | 5/1993 | Charlson ................. F16L 33/32 285/238 |
| 5,503,437 A | 4/1996 | Cronley |
| 5,649,723 A | 7/1997 | Larson |
| 6,325,425 B1 | 12/2001 | Kierath et al. |
| 6,431,217 B2 | 8/2002 | Robinson |
| 6,685,229 B2 | 2/2004 | Morrison |
| 6,786,516 B2 | 9/2004 | Cronley |
| 7,140,645 B2 | 11/2006 | Cronley |
| 7,174,921 B1 | 2/2007 | Wiltse |
| 7,270,350 B2 | 9/2007 | Cronley |
| 8,070,188 B2 | 12/2011 | Cronley |

\* cited by examiner

QUICK CONNECT COUPLING DEVICE FOR USE WITH HOSES AND HOSES INCLUDING QUICK CONNECT COUPLING DEVICE

CROSS-REFERENCE TO RELATED APPLICATIONS

This application constitutes a Continuation-In-Part of our prior application, Ser. No. 15/427,749, filed on Feb. 8, 2017, entitled Quick Connect Coupling Device For A Hose And A Quick Connect Cap For Bottle Or Other Vessel, the disclosure of which is incorporated by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

Field of the Invention

This invention relates generally to couplings for hoses and more particularly to quick connect coupling devices for garden hoses and other types of hoses and caps including quick connect means for releasably sealing bottles or other hollow vessels.

Numerous couplers or connectors for connecting the end of a hose, such as a garden hose, to an externally threaded or un-threaded bib or spout of a faucet are commercially available. For example, many prior art hoses include connectors in the form of an internally threaded female component secured to the end of the hose and which female member is adapted to be screwed onto the externally threaded spout of the faucet. Such a connector is typically made of a metal, e.g., brass, which will not corrode when the connector is left out of doors and subjected to the ambient weather. One particular drawback of such a connector is that it may be somewhat difficult to connect to the externally threaded spout of the faucet by persons having limited manual dexterity, e.g., aged or infirm persons suffering from arthritis or other conditions which make it difficult to screw the connectors together. Another drawback of such prior art connectors is that they typically require use of a resilient material washer or gasket to form a water-tight interface between the connector and the threaded spout of the faucet when the connector is screwed thereon. Such washers wear out or are lost, thereby subjecting the connection to water leakage at the interface. Other disadvantages prior art is comprised of multiple pieces that may get separated, lost or broken rendering the connector useless.

Various quick connect couplers have been disclosed in the patent literature to enable the quick coupling of a hose to the spout of a faucet to overcome some of the disadvantages of the prior art. Examples of such devices are shown in U.S. Pat. No.: 4,443,028 (Hayes), U.S. Pat. No. 4,660,803 (Johnston et al.), U.S. Pat. No. 5,503,437 (Cronley), U.S. Pat. No. 5,649,723 (Larsson), U.S. Pat. No. 6,325,425 (Kierath et al.), U.S. Pat. No. 6,786,516 (Cronley), and U.S. Pat. No. 7,270,350 (Cronley).

While the above identified prior art may be suitable for their intended purposes, they still leave something to be desired from one or more of the following aspects, simplicity of construction, cost, and ease of use. Thus, a need exists for a coupling device which overcomes the disadvantages of the prior art.

The subject invention addresses that need by providing coupling devices for use with a faucet, hose valve, or bib having to releasably connect a garden or other hose thereto and which overcomes the disadvantages of the prior art.

SUMMARY OF THE INVENTION

In accordance with one aspect of this invention a coupling device is provided for releasably securing a hose to a faucet or a first hose. The first hose has an end portion (e.g., an externally threaded portion) terminating in a free end surface. The coupling device basically comprises a tubular connector member, a clamp, a housing assembly, and an actuating assembly. The tubular connector member includes a connector for connection to the second hose. The clamp comprises concave curved portions configured for clamping the end portion of the faucet or first hose between the curved portions. The housing assembly comprises a first member a second member. The first member has a cavity configured for receipt of one of the concave curved portions. The second member is pivotably connected to the first member and located generally opposite the first member. The second member has a cavity configured for receipt of another of the concave curved portions. The second member is pivotable between an open position and a closed sealing position, and vice versa. The actuating assembly is coupled to the first and second members to pivot the second member between the open and closed sealing positions, whereupon when the second member is pivoted from the open position towards the closed sealing positon the concave portions of the clamp tightly engage the end portion of the faucet or first hose to releasably secure the coupling device to the faucet or first hose. The second member when in the closed sealing position results in the formation of a fluid-tight seal between the coupling device and the faucet or first hose. The coupling device when in the open position is configured for removal from the faucet or first hose.

In accordance with another aspect of this invention the end portion of the faucet or first hose includes a central longitudinal axis, wherein the actuating assembly additionally comprises a pressure applying member located on the central longitudinal axis and configured to he moved in a direction parallel to the central longitudinal axis to cause a surface of said tubular connector member to engage a washer located on the central longitudinal axis and interposed between the free end surface and the surface of the tubular connector member to cause the washer to be tightly interposed therebetween to thereby result the fluid-tight seal when the second member is in the closed sealing position.

In accordance with another aspect of this invention the second member is also configured to be pivoted to an intermediate securement position between the open position and the closed sealing position. The coupling device is releasably secured to the faucet or first hose in the intermediate securement position and forms the fluid-tight seal in the closed sealing position.

In accordance with another aspect of this invention the actuating assembly comprises a member that is movable between a first position, a second position and a third position, whereupon the second member is in the open position when the actuating member is in the first position, the second member is in the intermediate securement position when the actuating member is in the second position, and the second member is in the closed sealing position when the actuating member is in the third position.

In accordance with another aspect of this invention the tubular connector member extends along the central longitudinal axis between the first and second members.

In accordance with another aspect of this invention the pressure applying member comprises a ring having a front surface configured for engaging a surface of the tubular connector member, a rear cam surface, and a central opening through which a portion of the tubular connector member extends. The actuating assembly additionally comprises an actuator ring having a central opening through which a portion of the tubular connector member extends, and a front cam surface. The actuator ring is configured to be rotated about the central longitudinal axis in response to the movement of the actuating member to the first, second and third positions. The front cam surface of the actuator ring is configured for engaging the rear cam surface of the pressuring applying member to move the pressure applying member in a direction along the central longitudinal axis when the actuating member is in the third position, whereupon the front surface of the pressure applying member moves said tubular connector so that a surface of said tubular connector is in tight engagement with the washer to compress the washer and form the fluid-tight seal therebetween.

In accordance with another aspect of this invention the actuating member is a pivotable lever.

In accordance with another aspect of this invention the actuator ring comprises a finger projecting, outward therefrom and configured to slide within a slot in the pivotable lever.

In accordance with another aspect of this invention the first member is a clam-shell shaped member, and the second member is a clam-shell shaped member. The first and second members are pivotably connected to each other at the bottom thereof by a hinge joint. Each of the first and second members has a top portion including a cam surface. The pivotable lever includes cam surfaces configured for engaging the cam surfaces of the first and second members, whereupon movement of the pivotable lever from the first position to the second position causes the first and second members to pivot toward each other about the hinge joint into the intermediate securement position, whereupon movement of the pivotable lever from the second position to the third position causes the first and second members to pivot further toward each other about the hinge joint into the closed sealing position, and whereupon movement of the pivotable lever from the third position to the first position causes the first and second members to pivot away from each other about the hinge joint into the open position. The coupling device when in the open position is removable from the faucet or first hose.

In accordance with another aspect of this invention the pressure applying member includes a pair of projections extending outward radially from an outer surface of the ring and diametrically opposed to each other, and whereupon each of the clam-shell members includes a linear slot extending along an inner surface thereof and parallel to the central longitudinal axis. Each of the slots is configured to receive a respective one of the projections to guide the pressure applying member towards the surface of the tubular connector member to move the tubular connector member to compress the washer when the pivotable lever is moved from the second position to the third position.

In accordance with another aspect of this invention each of the concave curved portions comprises a concaved curved outer surface of a shoe formed of a resilient material, and wherein each of the clam-shell members includes a respective one of the cavities for receipt of a respective one of the shoes.

In accordance with another aspect of this invention the end portion of the faucet or first hose includes externally threads, and wherein said concave curved portions of said clamp are configured to tightly engage said external threads when said first and second members are in said intermediate securement position.

In accordance with another aspect of this invention the connector comprises an internally threaded socket.

In accordance with another aspect of this invention the connector comprises an externally threaded sleeve.

In accordance with another aspect of this invention the connector comprises a socket in which an end of the second hose is fixedly secured.

BRIEF DESCRIPTION OF THE DRAWING FIGURES

FIG. 23 is an isometric view of still another exemplary embodiment of a coupling device constructed in accordance with this invention; and.

DETAILED DESCRIPTION OF THE PREFERRED EMBODIMENTS

Figure 1:
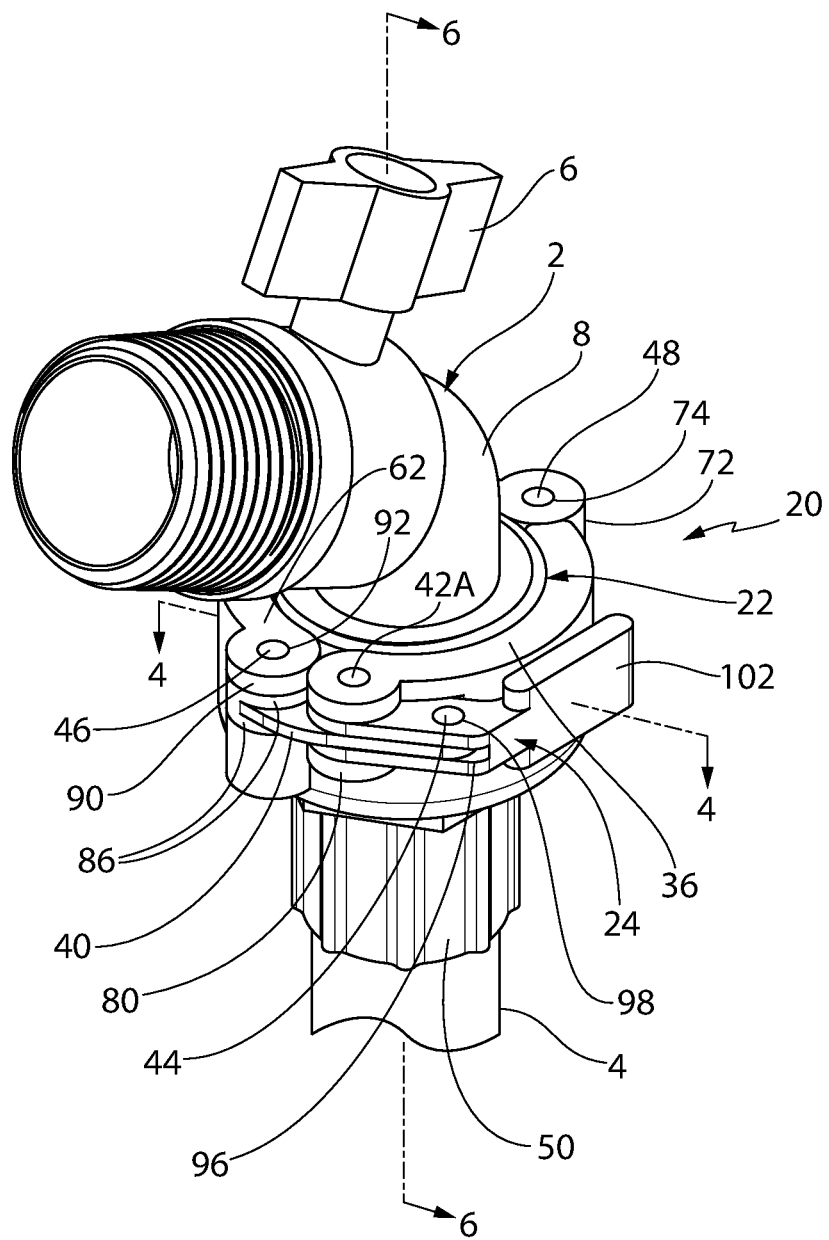
FIG. 1 is an isometric view of one exemplary embodiment of a coupling device constructed in accordance with this invention mounted onto an externally threaded bib or spout of a faucet to releasably secure a hose, e.g., a garden hose, thereto.
Figure 2:
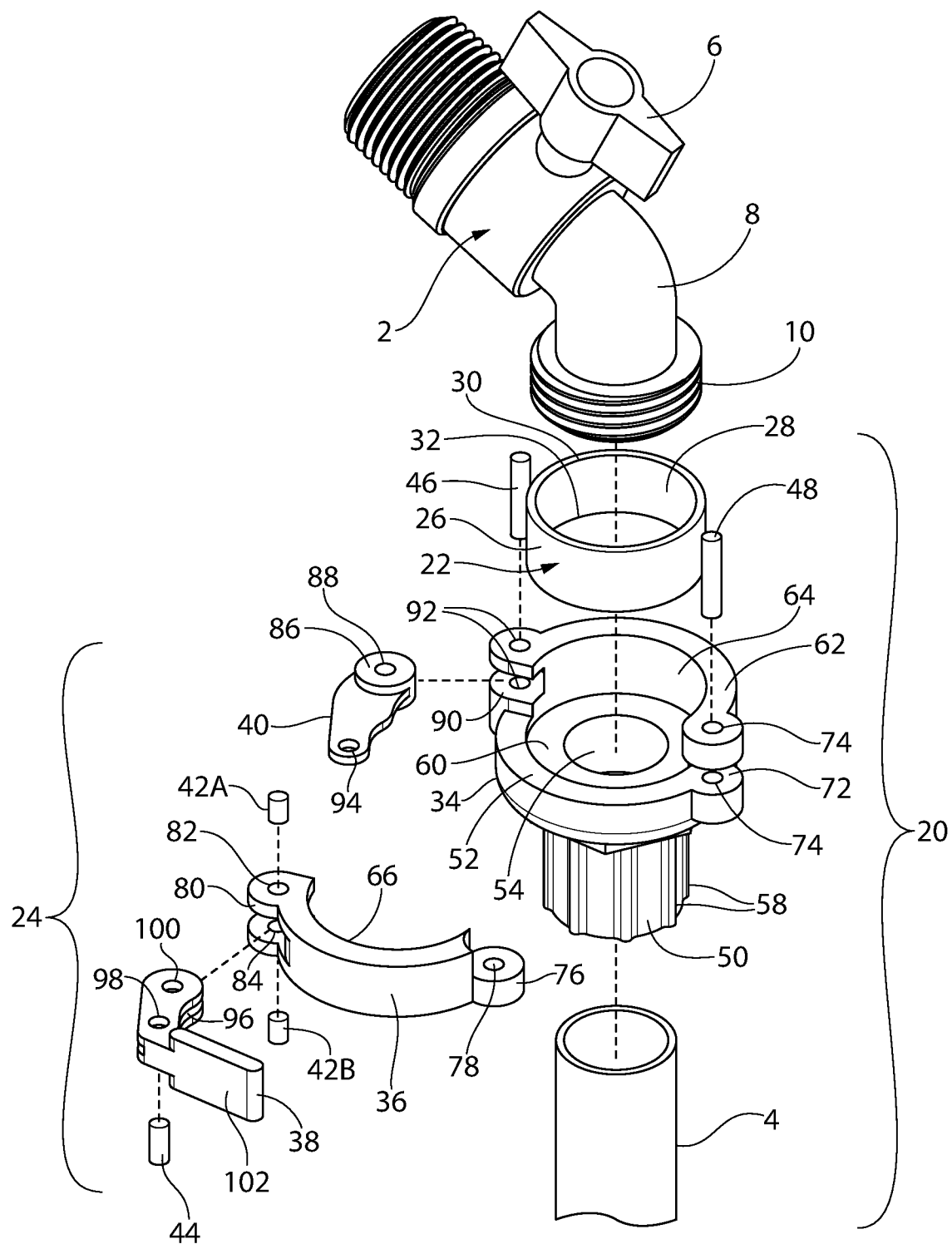
FIG. 2 is an isometric view, similar to FIG. 1, but showing the components making up the coupling device exploded.

Referring now to the various figures of the drawings wherein like characters refer to like parts there is shown in FIG. 1 one exemplary embodiment of a coupling device 20 constructed in accordance with this invention. The coupling device 20 is configured to be releasably connected to a hose hydrant, hose bib, tap or faucet 2 (all collectively referred to hereinafter as a "faucet") for carrying a liquid to which a hose 4 or other conduit is to be releasably secured. The faucet 2 shown in FIG. 1 is exemplary of a multitude of externally threaded devices to which the subject invention can be connected. However, it should be noted that the subject invention is suitable for releasable connection (mounting) to a hose hydrant, hose bib, tap or faucet whose free end is not externally threaded, e.g., is smooth. The exemplary faucet 2 includes a handle or knob 6 which is arranged to be turned twisted by a user to open or shut an internally located valve (not shown) in the faucet to enable or halt the flow of water (or any other liquid) from the faucet. The faucet includes a free end in the form of a bib or spout 8 which is externally threaded at 10 (FIG. 2). As will be seen from the discussion to follow the coupling device 20 is a quick-connect device that is configured to be readily releasably secured to the free end of the spout 8 by anyone, irrespective of their manual dexterity or ability to grasp, and without requiring the coupling device to be screwed onto the spout. Moreover, the nature of the interconnection between the coupling device 20 and the spout 8 renders it leak-proof, such that liquid can be carried from the spout into the coupling device to the hose without any leakage out of the coupling device.

Figure 7:
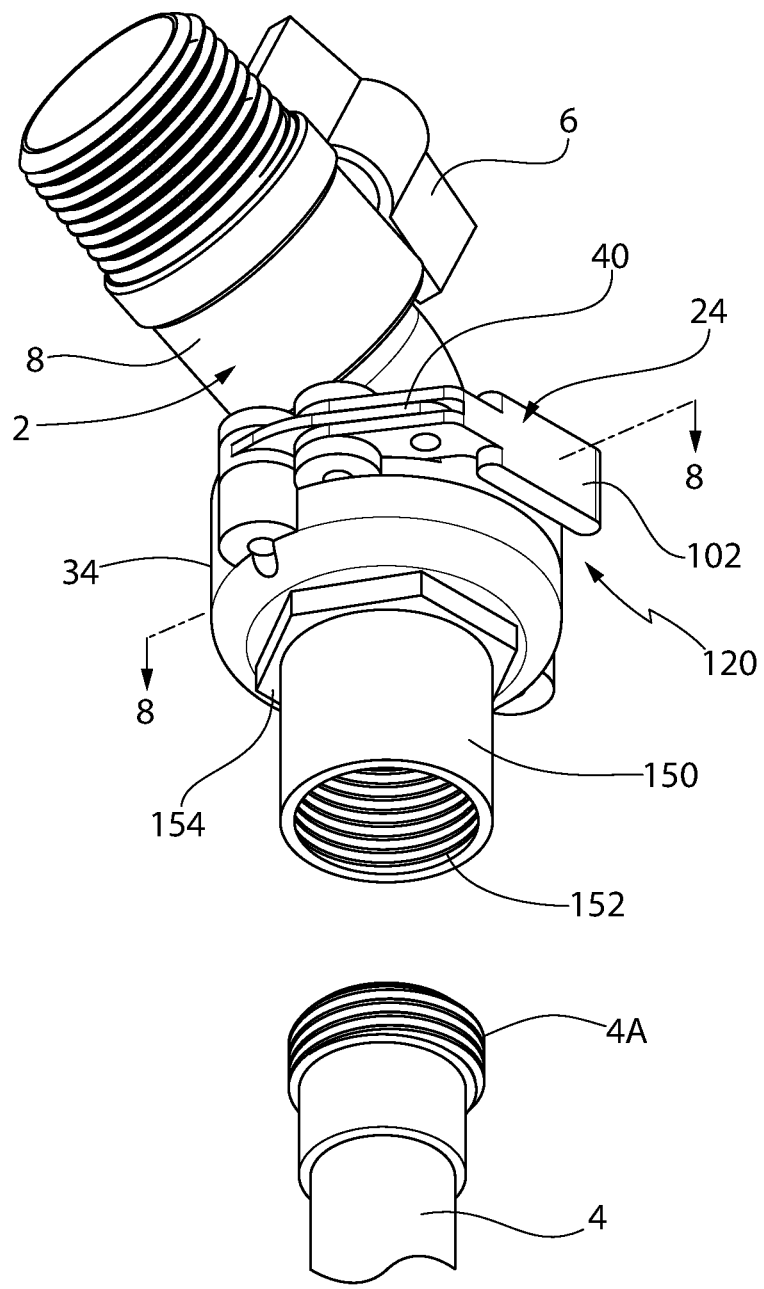
FIG. 7 is an isometric view of another exemplary embodiment of a coupling device constructed in accordance with this invention mounted onto an externally threaded bib or spout of a faucet to releasably secure a hose, e.g., a garden hose, thereto.
Figure 8:
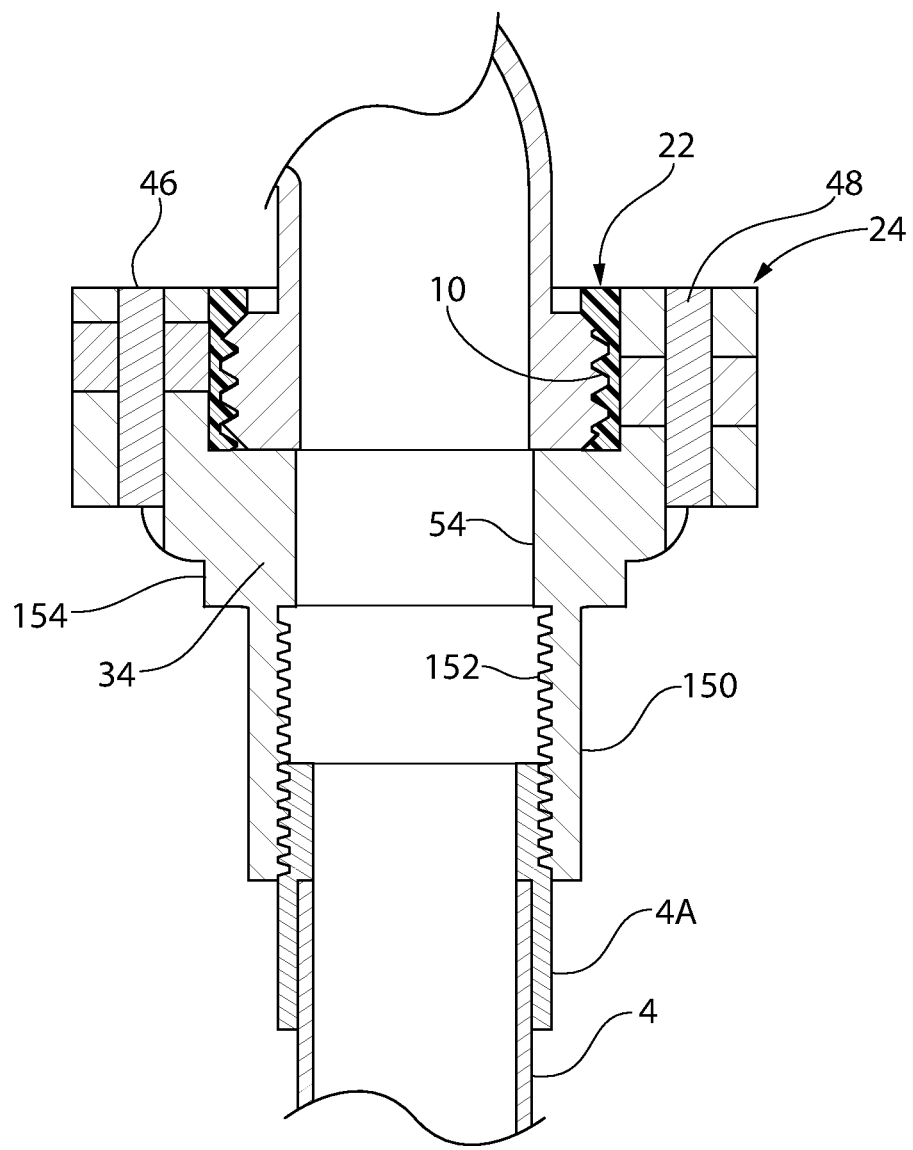
FIG. 8 is an enlarged sectional view taken along line 8-8 of FIG. 7.

The coupling device 20 is best seen in FIG. 2 and basically comprises an elastomeric sleeve 22 and a clamp assembly 24. The coupling device 20 forms a portion of the hose 4, i.e., it is fixedly secured to one end of the hose, i.e., the hose is specially constructed to include the coupling device 20. It should be noted at this juncture that the subject invention also entails a coupling device that is a stand-alone unit which can be releasably secured to a conventional hose. Thus, for example, as will be described in detail later, a coupling device constructed in accordance with this invention, may include a threaded socket for receipt of a male externally threaded connector of a conventional hose. That alternative, stand-alone, coupling device is shown in FIGS. 7 and 8, and is designated by the reference number 120. It will be described in detail later. Suffice it for now to state that both embodiments 20 and 120 of the invention make use of the same elastomeric sleeve and clamp assembly, except for some slight differences that will be described later.

Thus as can be seen in FIGS. 1-6, the elastomeric sleeve is a short tubular member formed of any suitable resilient material, e.g., rubber, etc. The sleeve 22 has a circular sidewall 26 bounding a central passageway 28 extending through it from its planar top end 30 to its planar bottom end 32. The inner diameter of the passageway 28 is just slightly greater than the outer diameter of the external threads 10 of the faucet's spout 8 to enable that portion of the spout to be freely inserted therein. The length of the passageway 28 of the sleeve 22 is preferably at least as long as the length of the externally threaded portion of the spout.

The clamp assembly 24 basically comprises a housing 34, a pressure applying member 36, a lever 38, a link 40 and plural pivot pins 42A, 42B, 44, 46 and 48. The housing 34 is an integral unit formed of any suitable material, e.g., a rugged, strong plastic material, but can be metal. The housing includes a bottom section 50 and a top section 52. The bottom section 50 is in the form of a hollow collar having a central passageway 54 (FIG. 6) including an annular recess 56 in which an end of the hose 4 is fixedly secured, e.g., adhesively secured. The outer surface of the collar includes a plurality of longitudinally extending ribs 58 to make the collar easy to grasp by a user. The top section 52 of the housing includes a circular cavity 60 including a backing wall 62 having a concave interior surface 64 in the form of an arc of a circle having a predetermined radius of curvature. The height of the backing wall 62 is approximately the height of the elastomeric sleeve 22. The cavity 60 is configured for receipt of the elastomeric sleeve 22, wherein the planar bottom edge 32 of the sleeve is disposed on the bottom of the cavity, with a portion of the exterior surface of the sleeve abutting the concave interior surface 64 of the backing wall. The sleeve is preferably fixedly secured in a cavity 60, but need not be fixedly secured, so long as it is resident within the cavity. In any case, with the sleeve 22 disposed within the cavity 60 the central passageway 54 in the housing 34 will be in fluid communication with the central passageway 28 in the sleeve.

Figure 4:
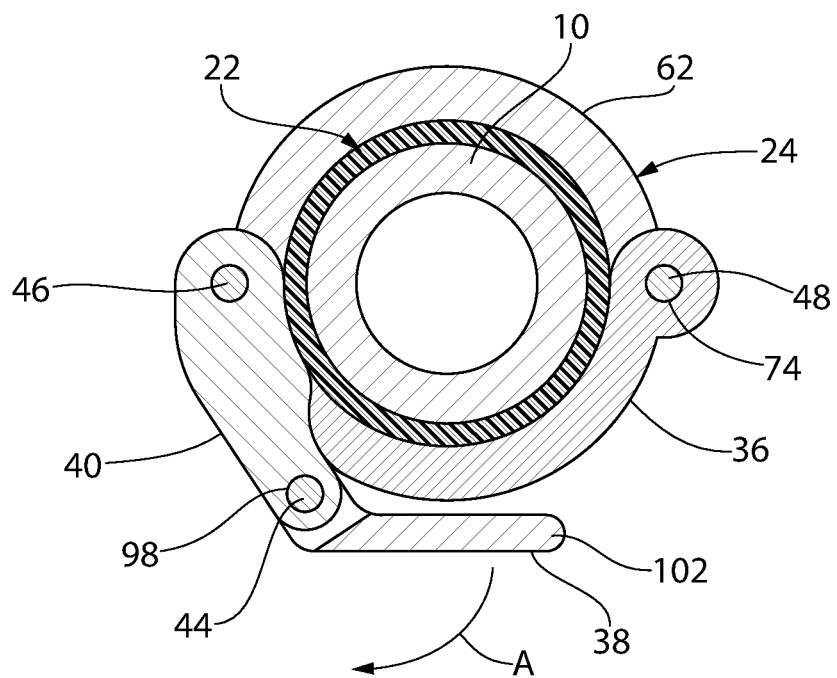
FIG. 4 is an enlarged sectional view taken along line 4-4 of FIG. 1.
Figure 5:
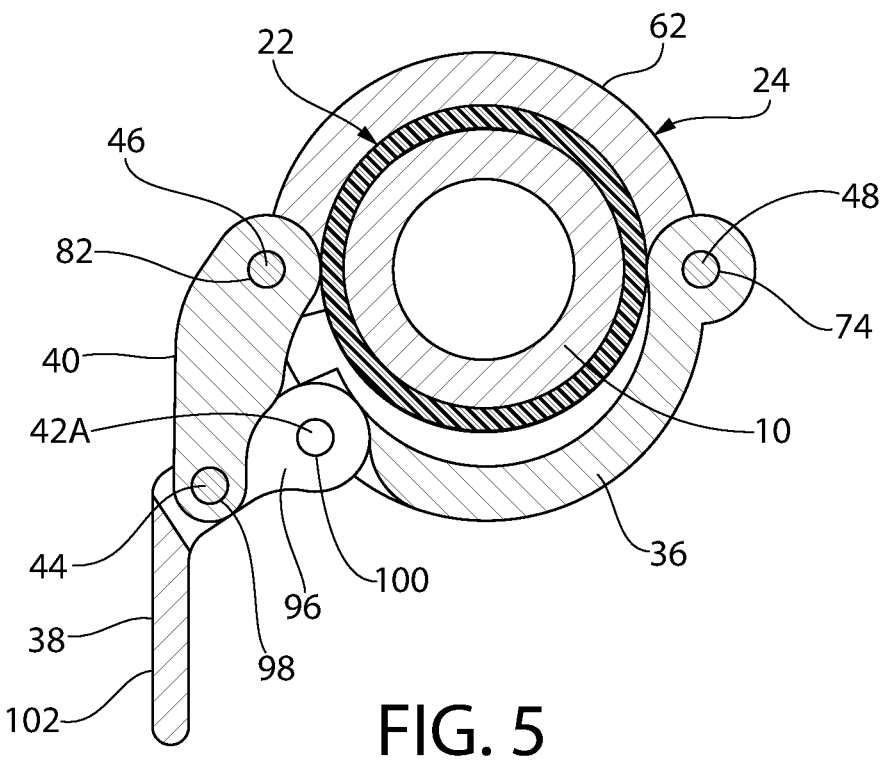
FIG. 5 is an enlarged sectional view similar to that of FIG. 4, but showing the coupling device in its opened state ready to be mounted onto the externally threaded bib or spout of a faucet.
Figure 6:
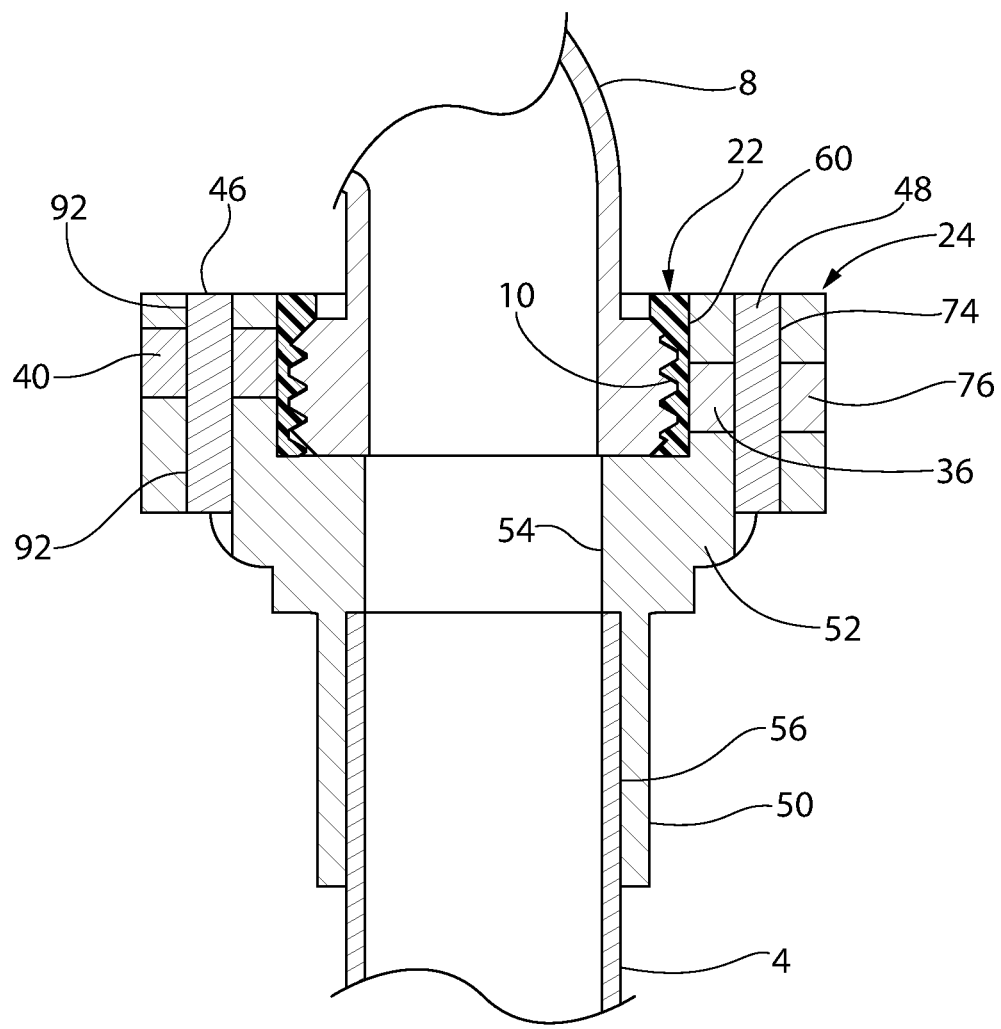
FIG. 6 is an enlarged sectional view taken along line 6-6 of FIG. 1.

The pressure applying member 36 is movably, e.g., pivotably, connected to the housing 34 and located generally opposite the concave interior surface 64 of the backing wall 62. The pressure applying member 36 includes a concave interior surface 66 having a radius of curvature approximately the same as the radius of curvature of concave interior surface 64 of the backing wall. The pressure applying member 36 is movable, e.g., pivotable, between an open position (shown in FIG. 5) and a closed position (shown in FIG. 4), and vice versa, as will be described later. Suffice it for now to state that the concave interior surface 66 of the pressure applying member 36 is configured to engage an external portion of the sleeve 22 to compress the sleeve between it and the concave interior surface 64 of the backing wall 62 to compress the sleeve and cause it to tightly engage the externally threaded portion 10 of the spout of the faucet when that portion of the spout is located within the elastomeric sleeve and the pressure applying member is in the closed position. That action releasably secures the clamp assembly to the faucet and enables the threads of the threaded portion of the faucet's spout to dig into the elastomeric material making up the sleeve, thereby forming a good fluid-tight interface therebetween, such as shown in FIGS. 4 and 6.

When the pressure applying member 36 is pivoted to the open position, as will also be described later, its concave interior surface 66 will be brought out of engagement with the portion of the elastomeric sleeve disposed opposite the backing wall 62. That action enables the elastomeric sleeve to expand radially outward to its normal and uncompressed state, whereupon the external threads 10 of the spout will be freed from the interior surface of the sleeve so that the clamp assembly and the sleeve can be removed as a unit from the faucet.

The movement or pivoting of the pressure applying member 36 from its open position to its closed position and vice versa is accomplished via the lever 38, the link 40 and the pivot pins 42-48 being coupled together to form an "over-center" clamp arrangement. In particular, one end of the backing wall 62 includes a yoke 72. The yoke 72 includes a pair of axially aligned holes 74. The outer end of the pressure applying member 36 includes an ear 76 projecting outward therefrom. The ear includes a hole 78 which is configured to be axially aligned with the holes 74 when the ear 76 is located within the yoke 72. This arrangement pivotably connects the outer end of the pressure applying member to the housing. The inner end of the pivotable member 36 is in the form of a yoke 80. The yoke 80 includes a pair of axially aligned holes 82 and 84. The link 40 includes an inner end in the form of a pair of oppositely disposed raised bosses 86 having a hole 88 extending therethrough. The inner end of the link is configured to be disposed within a yoke 90 at the opposite end of the backing wall 52. The yoke 90 includes a pair of axially aligned holes 92 which align with the hole 88 in the inner end portion of the link 40 when the bosses of the link are within the yoke 90. The pivot pin 46 extends through those aligned holes to pivotably connect the inner end of the link 40 to the yoke 90. The opposite or outer end of the link 40 includes a hole 94. The lever 38 includes a yoke-like body portion 96 having a first pair of axially aligned holes 98 extending therethrough at approximately the middle of the lever 38 and a second pair of axially aligned holes 100 extending therethrough adjacent the inner end of the body portion 96. The outer end of the link 40 is disposed within the yoke-like body portion 96 of the lever 38, with hole 94 of the link being axially aligned with the first pair of holes 98 and with the pivot pin 44 extending through the aligned holes 94 and 98. That action pivotably connects the outer end of the link to the middle of the lever. The yoke-like portion 96 of the lever is itself located within the yoke 80 of the pressure applying member 36 such that the holes 82, 84 and 100 are axially aligned. The pivot pin 42A extends through one of the pair of holes 100 and the axially aligned hole 82. In a similar manner, the pivot pin 42B extends through the other of the pair of the holes 100 and the axially aligned hole 84. This action pivotably connects the end of the lever opposite the handle 102 to the yoke 80 of the pressure applying member 36. The outer end of the link 40 is configured to be located within the yoke 90 at the inner end of the backing wall 62 and pivotably connected thereto by the pivot pin extending through the aligned holes 92, 88 and 92.

Accordingly, the pivotable connection of the lever 38 and the link 40 to the pressure applying member 36 and the pivotable connection of the link 40 to the backing wall 62 of the housing 34 establish an "over-center" clamp arrangement. As such, when the lever 38 is pivoted in the clockwise direction, like shown by the curved arrow A in FIG. 3, the clamping member 36 will be pivoted to its opened position. Conversely, when the lever 38 is pivoted in the opposite (counter-clockwise) direction, that action pivots the clamping member 36 about the axis of the pin 48 to the closed position, like shown in FIGS. 1 and 4. In that position, the clamping member compresses the sleeve 22 into intimate engagement with the threads of the spout, as described above. Moreover, the over-center nature of the clamp assembly assures that when the clamp assembly is in the closed position or state that it remains in that position or state and is resistant to accidental opening. It is only upon the purposeful pivoting of the lever in the clockwise direction that the clamp assembly is opened.

Figure 3:
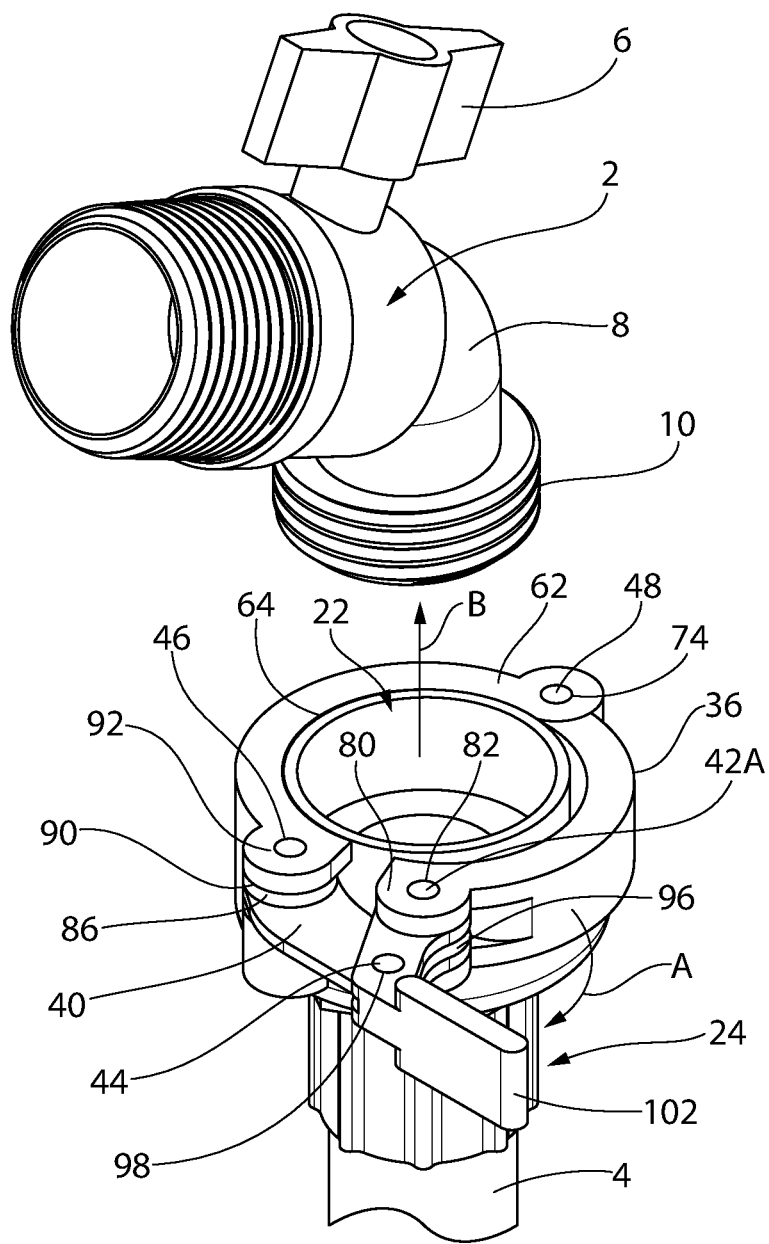
FIG. 3 is an isometric view showing the coupling device of FIG. 1 in the process of being mounted onto the externally threaded bib or spout of the faucet.

Turning now to FIG. 3 the manner of releasably mounting the coupling device 20 with its integrally connected hose 4 onto the faucet 2 will now be described. To that end, the handle 102 of the lever 38 is grasped and pivoted about the aligned axes of pivot pins 42A and 42B in the clockwise direction. That action has the effect of pivoting the link 40 with respect to the lever, whereupon the link is also pivoted in the clockwise direction, but in this case about the axis of the pivot pin 46. The pivoting of the link with respect to the lever is accomplished via the pivotable connection between those components as established by the pivot pin 44. The pivoting of the link 40 in the clockwise direction coupled with the pivoting of the lever in clockwise direction pulls on the inner end of the pressure applying member 36 to cause it pivot in the counter-clockwise direction about the pivot pin 48. The counter-clockwise pivoting of the pressure applying member 36 results in the clamp assembly being in its opened position. That action frees the elastomeric sleeve 22 from the compression force that the pressure applying member had applied on it, whereupon the elastomeric sleeve expands to its natural, unbiased uncompressed) state, like shown in FIGS. 3 and 5.

Once the clamping assembly is in its opened state it is ready for releasable securement to the faucet's spout. To that end, the coupling device 20 and its integrally connected hose 4 is then be moved in the direction of the arrow B shown in FIG. 3 toward the externally threaded free end portion 10 of the faucet's spout until the external threads of the spout are fully within the central passageway 28 in the elastomeric sleeve. Once that has occurred, the lever 38 is pivoted in the counter-clockwise direction, whereupon the inner end of the pressure applying member is pivoted inward in the clockwise direction about the axis of the pivot pin 48. That action tightly squeezes the elastomeric sleeve between the curved interior surface 66 of the pressure applying member 36 and the curved interior surface 64 of the backing wall 62 of the housing, whereupon the helical threads of the spout dig into the inner surface of the elastomeric sleeve as described above and shown in FIGS. 1, 4 and 6. The over-center nature of the linkages provided between the components of the clamp assembly insures that the clamp assembly stays in that closed state until the lever is again pivoted in the clockwise direction to open the clamp assembly.

Turning now to FIGS. 7-8, the details of the coupling device 120 will now be described. That device is identical in construction to the coupling device 20 except for the construction of the housing. In particular, the housing 34 includes a portion (to be described immediately hereafter) for releasably securing a conventional male externally threaded connector 4A of a hose 4 thereto. In the interest of brevity the details of the construction and operation of the components and features of the coupling device 120 which are identical to the coupling device 20 will be given the same reference numbers and will not be reiterated. Thus, as can be seen the housing 34 of the coupling device 120 includes a bottom section 150 in the form of a hollow collar having internally threaded section 152 at the lower end of the central passageway 54. That internally threaded section 152 is configured to have a male externally threaded connector 4A of a hose 4 screwed therein to releasably connect the hose to the coupling device 120. The outer surface of the collar 152 at the top end 154 thereof is in the shape of the periphery of a hex head nut. That feature is provided to enable the coupling member 120 to be grasped by a wrench or some other tool, if necessary, to hold the coupling device when the male externally threaded connector 4A of the hose 4 is screwed into the threaded section 152.

As mentioned above the elastomeric sleeve and the clamping assembly forming portions of the coupling devices 20 and 120 can be used to form a cap assembly for releasable securement to the externally threaded mouth of a bottle or any other hollow vessel. Thus, attention should now be turned to FIGS. 9-11, where there is shown a bottle 12 (or other hollow vessel) having an externally threaded mouth 14 (FIG. 10) to which a cap device 220 constructed in accordance with this invention is releasably mounted to seal the mouth of the bottle or vessel. The cap device 220 is identical in most respects to the coupling devices 20 and 120, except for differences in the construction of the housing. In particular, the housing of the clamp assembly of the cap device 220 includes a cover member (to be described in detail shortly) for covering and sealing the mouth of the bottle when the cap device is in place.

Figure 9:
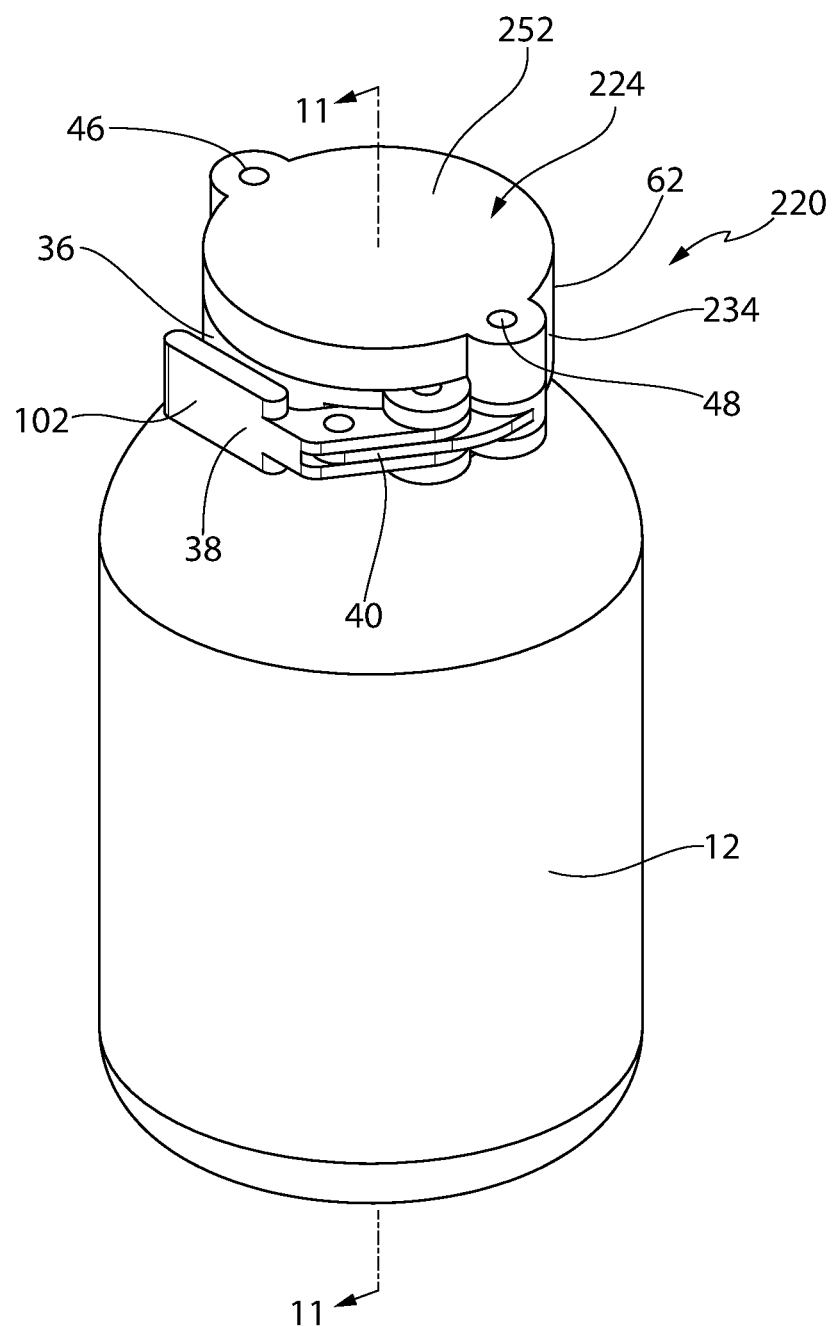
FIG. 9 is an isometric view of an exemplary embodiment of a cap device for a bottle or other vessel having an externally threaded mouth, wherein the cap device is constructed in accordance with this invention and is shown mounted onto the externally threaded mouth of the bottle.
Figure 10:
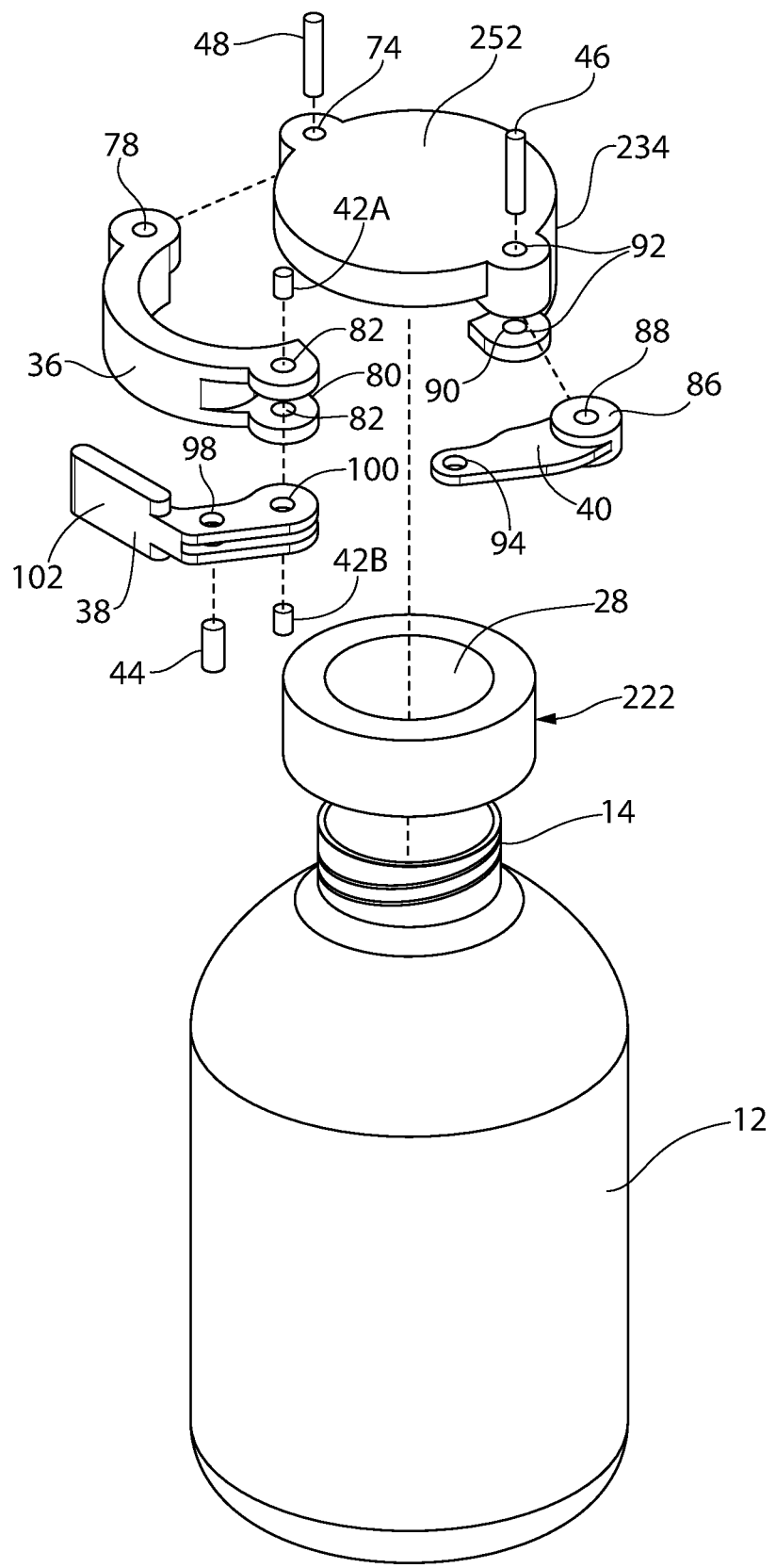
FIG. 10 is an isometric view, similar to FIG. 9, but showing the components of the cap device exploded.
Figure 11:
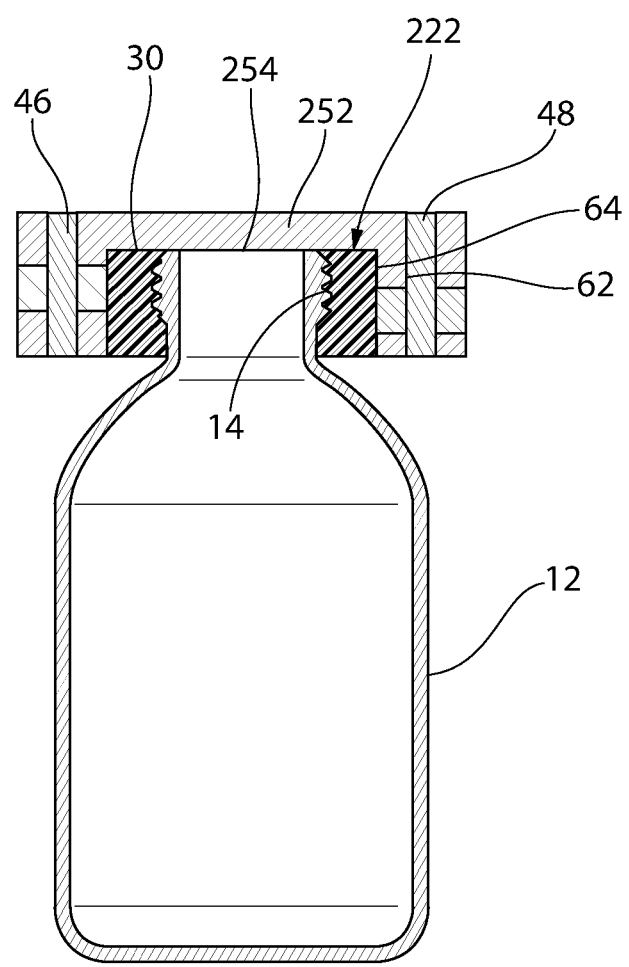
FIG. 11 is a sectional view taken along line 11-11 of FIG. 9.
Figures 12A, 12B:
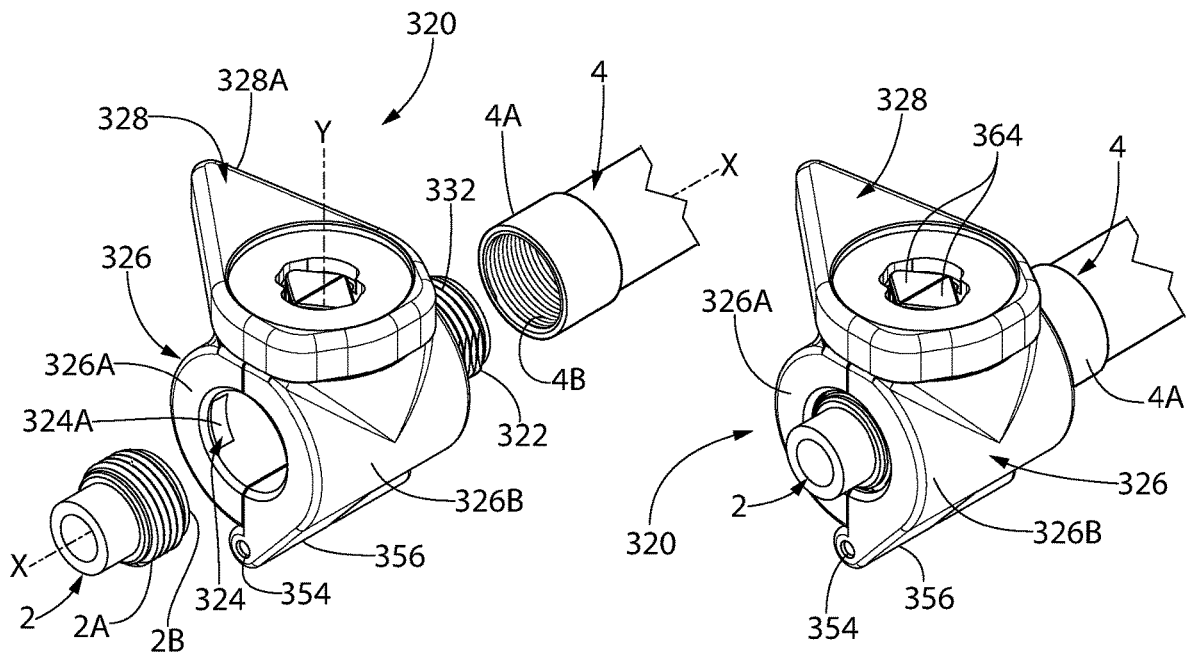
FIG. 12A is an exploded isometric view of another and more preferred exemplary embodiment of a coupling device constructed in accordance with this invention shown in the process of being releasably mounted onto an externally threaded bib or spout of a faucet to releasably secure a hose, e.g., a conventional garden hose, thereto.
FIG. 12B is an isometric view of the exemplary embodiment shown in FIG. 12A after the coupling device has been mounted on the faucet and after the hose has been releasably secured to the coupling device.
Figure 13:
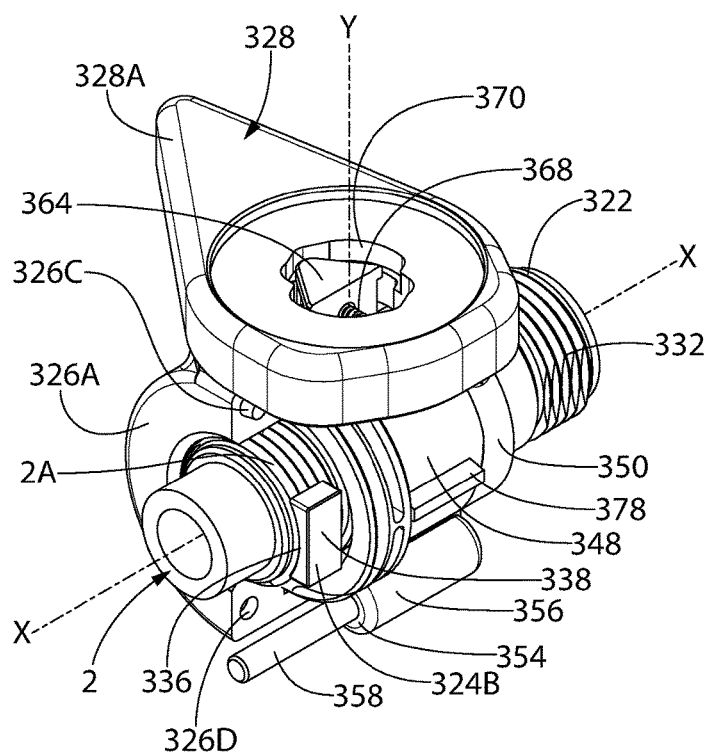
FIG. 13 is a somewhat enlarged isometric view of the coupling device of FIG. 12A with a portion of the device, i.e., one clam-shell shaped member of a housing making up the device, removed to show the internal components of the coupling device.

In the interest of brevity the details of the construction and operation of the components and features of the cap device 220 which are identical to the coupling devices 20 and 120 will be given the same reference numbers and will not be reiterated. Thus, as can be seen of the cap device 220 comprises an elastomeric sleeve 222 (FIGS. 10 and 11) and a clamp assembly 224 (FIGS. 9-11). The elastomeric sleeve 222 is constructed similarly to the elastomeric sleeve 22, except that the sidewall of sleeve 222 is thicker (although it need not be thicker).

The clamp assembly 224 is best seen in FIGS. 10 and 11 and includes a housing 234 having an upper cover portion 252. The cover portion 252 has a circular cavity 254 (FIG. 11) in its bottom surface. The cavity 254 is constructed similar to the cavity 60. The housing 234 also includes a backing wall 62 projecting downward from the undersurface of the cover portion contiguous with the cavity 254. The backing wall has a concave interior surface 64 in the form of an arc of a circle having a predetermined radius of curvature. The height of the backing wall 62 is approximately the height of the elastomeric sleeve 222. The cavity 60 is configured for receipt of the elastomeric sleeve 222, wherein the planar top edge of the sleeve is disposed on the bottom of the cavity, with a portion of the exterior surface of the sleeve abutting the concave interior surface 64 of the backing wall 62 as best seen in FIG. 11. The sleeve 222 is preferably fixedly secured in a cavity 60, but need not be fixedly secured, so long as it is resident within that cavity such that the cover portion 252 closes off the top of the sleeve's passageway 28, and with the bottom of the passageway being open.

The pressure applying member 36 is movably, e.g., pivotably, connected to the housing 234 and located generally opposite the concave interior surface 64 of the backing wall 62. The pressure applying member 36 includes a concave interior surface 66 having a radius of curvature approximately the same as the radius of curvature of concave interior surface 64 of the backing wall. The pressure applying member is movable, e.g., pivotable, between an open position and a closed position, and vice versa, like that described with reference to the coupling devices 20 and 120.

The open bottom end of the passageway is configured to receive the external threads 14 at the mouth of the bottle 12, whereupon when the pressure applying member is pivoted to the closed position or state the concave interior surface of the pressure applying member compresses the elastomeric sleeve between it and the concave interior surface 64 of the backing wall 62 to cause the elastomeric sleeve to tightly engage the externally threads of the bottle's mouth. That action releasably secures the cap device to the bottle, with the bottom of the cavity 254 tightly engaging the planar top surface 30 of the elastomeric sleeve 223, thereby sealing the bottle. When the pressure applying member 36 is pivoted to the open position, like that described above, its concave interior surface 66 will be brought out of engagement with the portion of the elastomeric sleeve 222 disposed opposite the backing wall 62. That action enables the elastomeric sleeve to expand radially outward to its normal and uncompressed state, whereupon the external threads of the bottle's mouth will be freed from the interior surface of the sleeve so that the cap device can be removed from the bottle.

Turning now to FIGS. 12-22B, the details of a more preferred exemplary embodiment of a coupling device 320 constructed in accordance with this invention will now be described. As can be seen in FIG. 12A the coupling device 320 is configured for mount onto a hose hydrant, hose bib, tap or faucet 2 (all collectively referred to hereinafter as a "faucet") for carrying a liquid to which a hose 4 or other conduit is to be releasably secured. The hose 4 shown in FIGS. 12A and 12B includes a socket 4A having internal threads 4B into which a connector (to be described later) of the coupling device can be threadedly engaged. It should be pointed out at this juncture that the faucet 2 shown in FIG. 12A is exemplary of a multitude of externally threaded devices to which the coupling device 320 can be connected or mounted and thus includes an externally threaded portion 2A extending along and encircling a central longitudinal axis X and terminating in a free end surface 2B. However, the coupling device 320 is also suitable for releasable connection (mounting) to a hose hydrant, hose bib, tap or faucet whose free end is not externally threaded, e.g., is smooth, so long as it terminates in a free end surface 2B. The details of the coupling device 320 will be described later. Suffice it for now to state that the coupling device 320 includes a clamp comprising a pair of shoes having curved portions configured to be pivoted from an open position or state to a position or stated (to be referred to as the "intermediate securement position or state") which clamps the externally threaded end portion 2A (or the un-threaded end portion) of the faucet 2 between those curved portions to mount the coupling device onto the faucet. In addition, the coupling device 320 comprises a washer which is configured to be compressed into a fluid-tight seal with the free end surface 2B of the faucet to prevent leakage of any liquid flowing from the faucet into and through the coupling device to the hose 4 connected to the coupling device when the coupling device is in another position or state, hereinafter referred to as the "closed sealing position or state").

Figure 14:
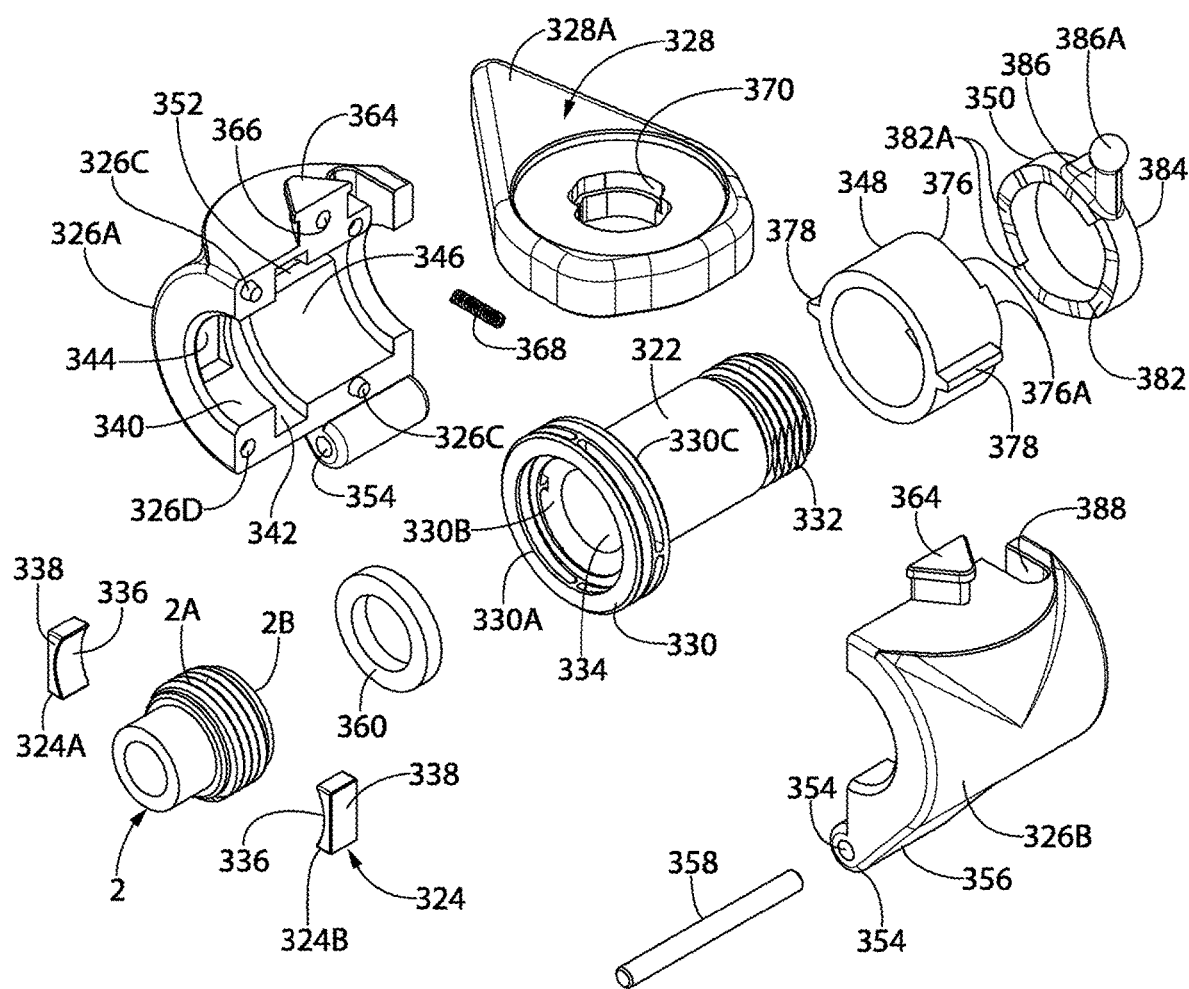
FIG. 14 is a reduced exploded isometric view of the externally threaded bib or spout of the faucet and the various components making up the coupling device of FIG. 12A.

It should also be noted at this juncture that coupling device 320 can be releasably connected onto a hose (like hose 4) instead of a faucet 2. In that case the hose to on which the coupling device is to be connected or mounted will be referred to as the first hose and the other hose 4 which is to be connected to the coupling device will be referred to as the second hose. Preferably the first hose has a male, externally threaded end connector terminating in a free end surface, whereupon the pair of shoes of the coupling device 320 can engage those external threads of the first hose to mount the coupling device onto the first hose, with the washer of the coupling device being configured to be compressed into engagement with the free end surface of the first hose to prevent leakage of any liquid flowing from the first hose into and through the coupling device to the second hose 4 connected to the coupling device The coupling device 320 basically comprises a tubular connector member 322, a clamp 324, a housing assembly 326, and an actuating assembly 328. The tubular connector member 322 is best seen in FIG. 14 and basically comprises a tubular body extending along and encircling a central longitudinal axis X. The tubular body has an internal end portion 330 and an external end portion 332. The internal end portion 330 is in the form of plural circular flanges which are disposed parallel to each other. The radius of curvature of the circular flanges is greater than the radius of curvature of the outer surface of the remainder of the tubular connector member. The external end portion is in the form helical external threads which in accordance with one embodiment of the coupling device 320 are configured to be threadedly engaged with the internally threads 4B of the hose 4 to releasably secure that hose to the coupling device. A central passageway 334 extends the entire length of the tubular connector. The end of the passageway 334 at the flanged end 330 is in the form of an enlarged opening 330A, the bottom of which is in the form of an annular ledge 330B. As will be described in detail later, the tubular connector member 322 is configured to be located within the housing assembly 326, with the central longitudinal axis the connector member 322 axially aligned with the central longitudinal axis X of the faucet 4 when the housing assembly is in its intermediate securement position or state. Those axially aligned axes X form the central longitudinal axis of the coupling device.

The clamp is best seen in FIG. 14 and basically comprises a pair of shoes 324A and 324B. Each of the shoes is in the form of a block of a rubber but other materials may be used. Each of the shoes has a concave arcuate front surface 336 and a generally planar rear surface 338. As will be described shortly, the shoes 324A and 324B are mounted within respective cavities in respective clam-shell shaped members making up the housing assembly, such that when those clam-shell shaped members are pivoted to the heretofore mentioned intermediate securement position or state the arcuate surfaces 336 of the two shoes tightly engage diametrically opposed portions of the external threads 4A to releasably secure the coupling device 320 onto the faucet 4. To that end, the radius of curvature of the arcuate front surface 336 is just slightly less than the radius of curvature of the external threads 2A of the faucet 2.

The housing assembly 326 is best seen in FIGS. 12A, 14, 18 and 22A and 22B. As can be seen it basically comprises first generally clam-shell shaped member 326A and a second generally clam-shell shaped member 326B. The clam-shell shaped members 326A and 326B are identical in construction and each includes an arcuate recess 340 facing inward. The radius of curvature of the recess 340 is just slightly greater than the radius of curvature of the outer edge of the flanged internal end 330 of the tubular connector member 322 to receive corresponding portions of the those flanges therein when the housing assembly is in the intermediate securement position. Thus, when in the intermediate securement position the two recesses 340 conjoin to form a circular passageway section.

Another arcuate recess 342 is located in each of the clam-shell shaped members 326A and 326B and also faces inward and is located adjacent the recess 340. The recess 342 is of a greater radius of curvature than the recess 340. The recess 342 includes a cavity 344 having a planar bottom surface. The cavity 344 in each clam-shell shaped member is configured to receive a respective one of the shoes 324A and 324B, with the planar surface 338 of the shoe resting on the planar bottom surface of the recess 342, such that the arcuate surface 336 of the shoe extends just slightly beyond the surface of the recess 342. Thus, when in the intermediate securement position or state the two recesses 342 conjoin to form a circular passageway section into which the curved surfaces 336 of the shoes project inward slightly.

Another recess 346 is located in each of the clam-shell shaped members 326A and 326B and also face inward. The recess 346 is located adjacent the recess 342 and is of a radius of curvature less than that of the recess 342, but greater than the radius of curvature of the recess 340. Thus, when in the intermediate securement position or state the two recesses 346 conjoin to form a circular passageway section that is configured to receive a pressure applying ring 348 (to he described later) and an actuator ring 350 (also to be described later) forming a portion of the actuating assembly 328. Each recess 346 also includes a linear slot 352 extending along the inner surface thereof and parallel to the central longitudinal axis X. Each slot 352 is configured to receive a respective linear projection or rail (to be described shortly) of the pressure applying ring 348.

Figure 22A:
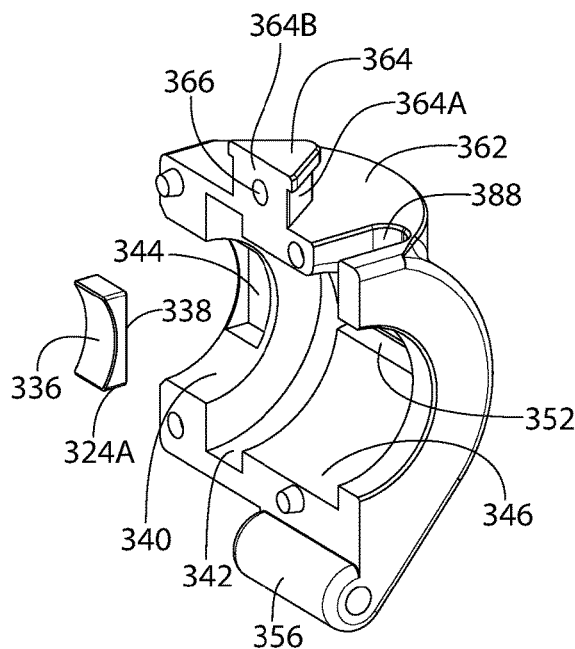
FIG. 22A is a somewhat enlarged exploded isometric view of one clam-shell member making up one portion of the housing of the coupling device of FIG. 12A and a clamping shoe having a concave surface configured to releasably engage a portion of the external threads of the faucet to releasably mount the coupling device onto the faucet.
Figure 22B:
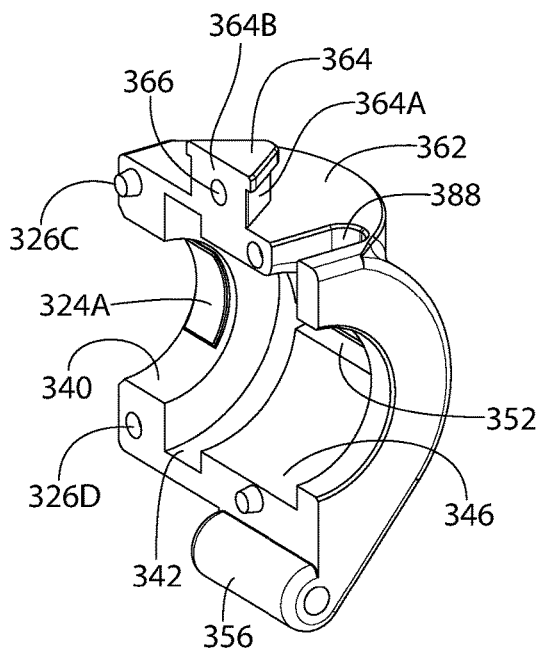
FIG. 22B is another isometric view similar to FIG. 22A but showing the clamping shoe located within a cavity in the clam-shell member.

The two the clam-shell shaped members 326A and 326B are pivotably connected to each other at their lower ends by means of a hinge 354. In particular, the lower end portion of each member 326A and. 326B includes a projection 356 having a longitudinally extending bore in which a portion of a pivot pin 358 is journaled. Thus, the two members 326A and 326B can be pivoted about the central axis of the pivot pin into various positions with respect to each other. In particular, as will be described later, the two clam-shell shaped members can be pivoted towards each other from the heretofore mentioned "open" position whereupon the upper ends of those two members are separated from each other, to a first partially closed position, which has been previously referred to as the "intermediate securement position or state". When the coupling device 320 is in the intermediate securement position or state with the end portion 2A of the faucet located within the housing assembly the coupling device will be releasably secured or mounted on the faucet. From that position the two clam-shell shaped members can be pivoted further towards each other to a second fully closed position previously referred to as the "closed sealing position". When the coupling device is in the closed sealing position a fluid-tight seal is created between the coupling device 320 and the faucet 2. That fluid-tight seal is effectuated by the compression of a washer 360 (to be described later) which is tightly interposed between the surface of the annular ledge 330B of the tubular connector member 322 and the free end 2B of the faucet 2. That action will be described later. Suffice it for now to state that it occurs as a result of the tubular connector member 322 being moved (slid) through the housing assembly by the operation of the actuating ring 350. As best seen in FIGS. 22A and 22B the planar inner surface of each of the clam-shell shaped members includes a pair of tapered bosses 326C and a corresponding pair of tapered bores 326D. The bosses 326C are configured to be received within the bores 326D when the clam-shell shaped members are pivoted into their intermediate securement position or state to thereby facilitate the pivoting of those members into that position or state. Moreover, the bosses will extend fully within the recesses when the clam-shell shaped members are in their closed sealing position or state.

Figure 18:
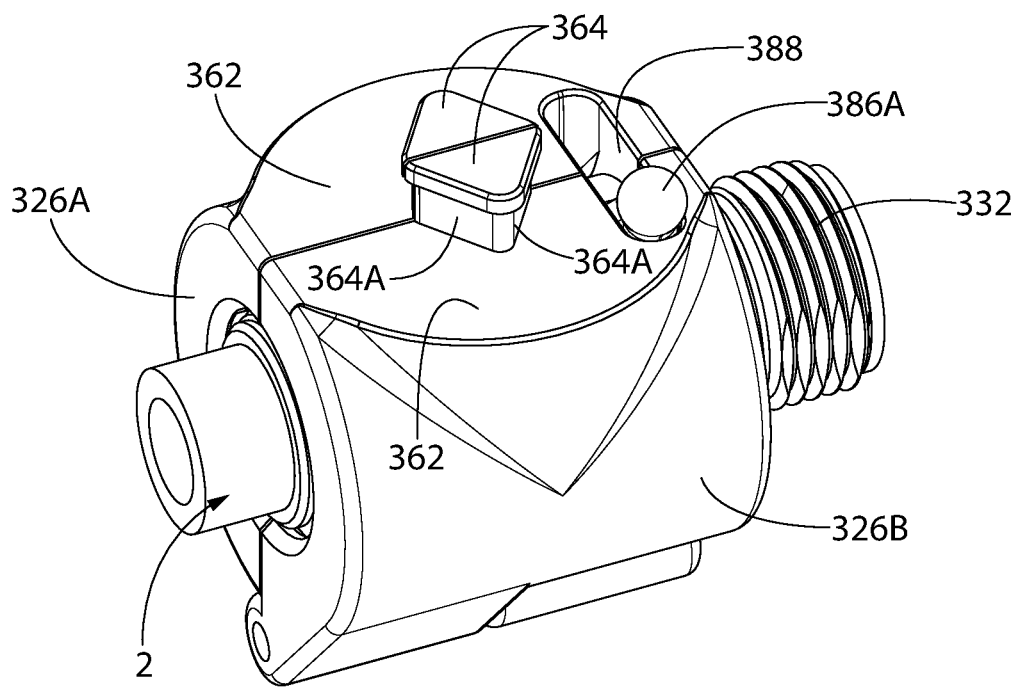
FIG. 18 is another, and somewhat enlarged, isometric view of the coupling device of FIG. 12B minus the actuating lever and the hose.

The movement or pivoting of the two clam-shell shaped members 326A and 3269 with respect to each other into their three positions or states is achieved by means a the actuating assembly328. In particular, a pivotable lever 328A of that assembly is configured to cooperate with plural cam surfaces at the top portion of each of the clam-shell shaped members. To that end, as best seen in FIG. 18, the top of each of the clam-shell shaped members 326A and 326B includes a planar top surface 362 from which a triangularly-shaped mesa 364 projects upward. The two outer facing sidewalls 364A of each mesa are undercut immediately below the top surface of the mesa and form cam surfaces configured to be engaged by cam surfaces of the pivotable lever 328A. The inner facing sidewall 364B of each mesa is not undercut, but rather is planar. When the two clam-shell shaped members 326A and 326B are in the intermediate securement position or state the two mesas are disposed close to each other with a slight space, e.g., up to approximately 2 mm, separating their inner facing sidewalls 364B. Whereas when the two clam-shell shaped members 326A and 326B are in the closed sealing position or state their inner facing sidewalls 364B are in abutment with each other.

Figure 19:
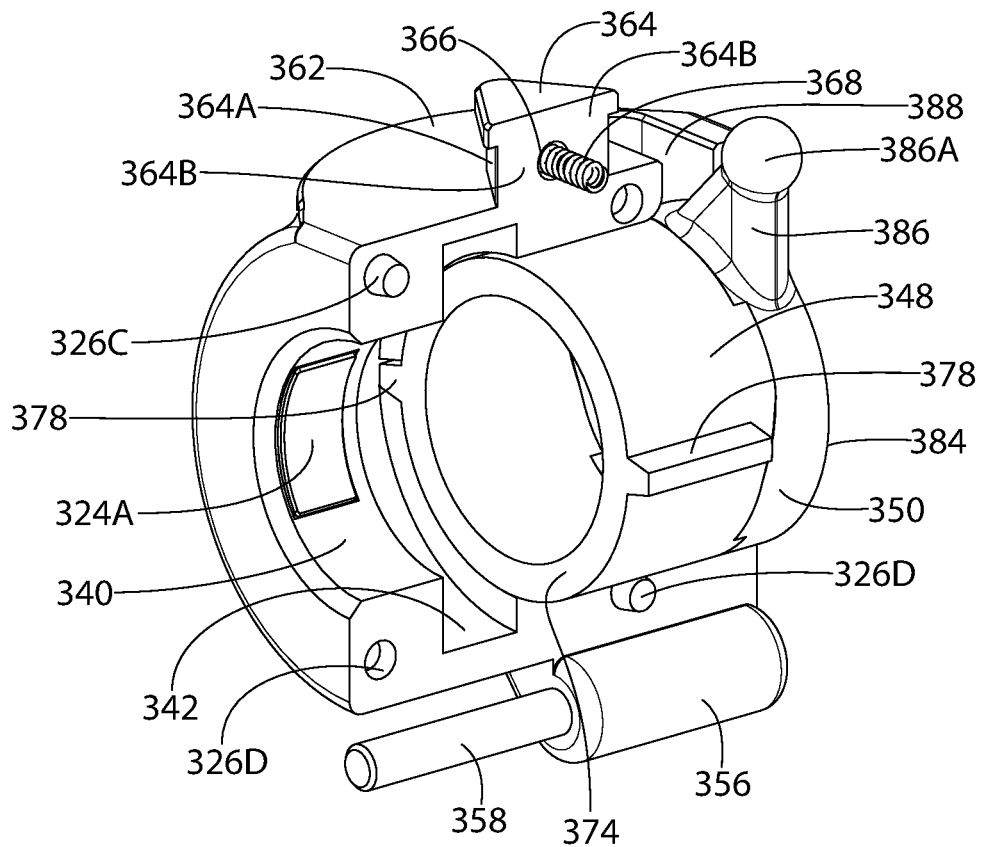
FIG. 19 is another, and somewhat enlarged isometric view of the coupling device shown in FIG. 13, minus the faucet and a few other components of the coupling device of FIG. 12A.
Figure 20:
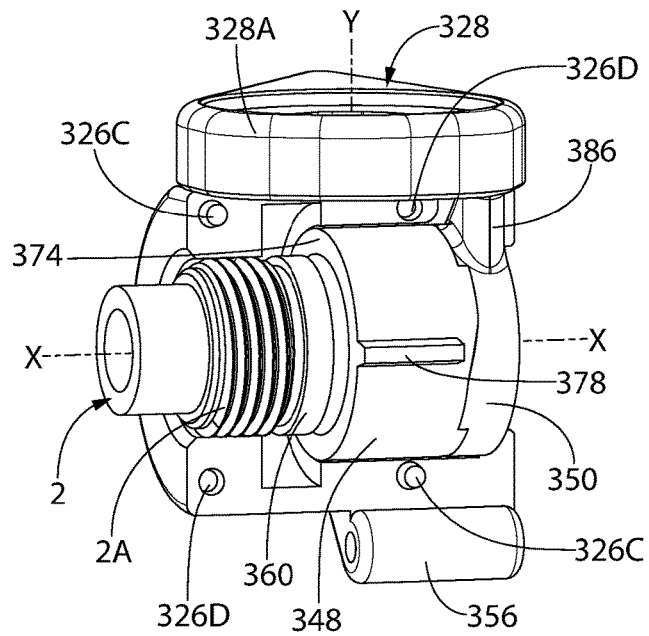
FIG. 20 is another, and somewhat reduced, isometric view of the coupling device shown in FIG. 13, minus a few of components of the coupling device of FIG. 12A, but showing the coupling device before the compression of the washer onto the free end of the faucet by the pressure applying ring.
Figure 21:
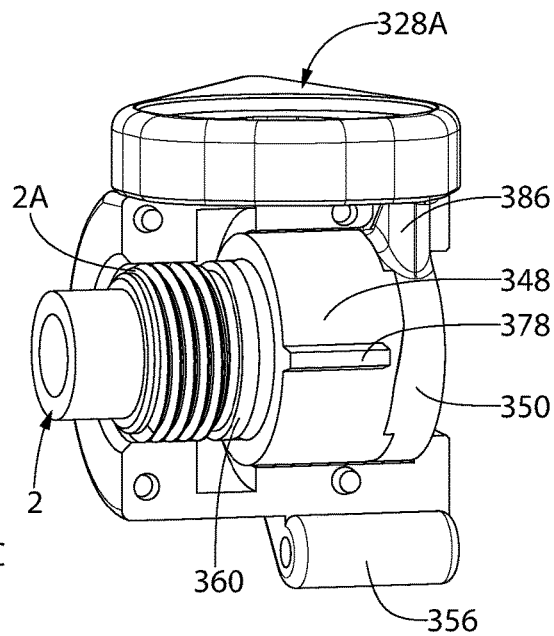
FIG. 21 is another isometric view similar to FIG. 20 but showing the coupling device after the compression of the washer onto the free end of the faucet by the pressure applying ring to form a fluid-tight seal between the faucet and the coupling device.

As best seen in FIG. 19 a bore 366 is located in the inner facing sidewall 364B of each mesa 364. The bores 366 of the two mesas will be approximately axially aligned when the clam-shell shaped members are in the intermediate securement position or state, and will be completely axially aligned when they are in the closed sealing position. A helical compression spring 368 (FIGS. 3, 17 and 19), whose outside diameter is less than the inside diameter of the bores 366, is located within the bores. In particular, one end of the spring 368 is located within the bore of the clam-shell shaped member 326A, while the other end of the spring is located within the bore of the clam-shell shaped member 326B. The helical spring 368 biases the upper end of the two clam-shell shaped members 326A and 326B away from each other toward their naturally open position or state.

Figure 15A:
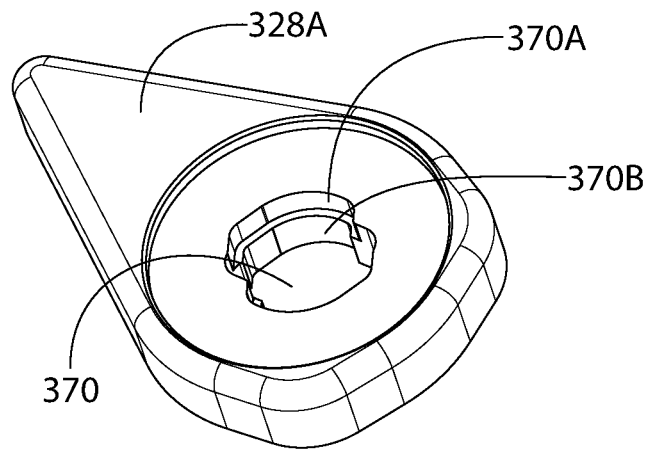
FIGS. 15A-15C are somewhat enlarged isometric views of one component (e.g., an actuating lever) of the exemplary coupling device of FIG. 12A.
Figure 15B:
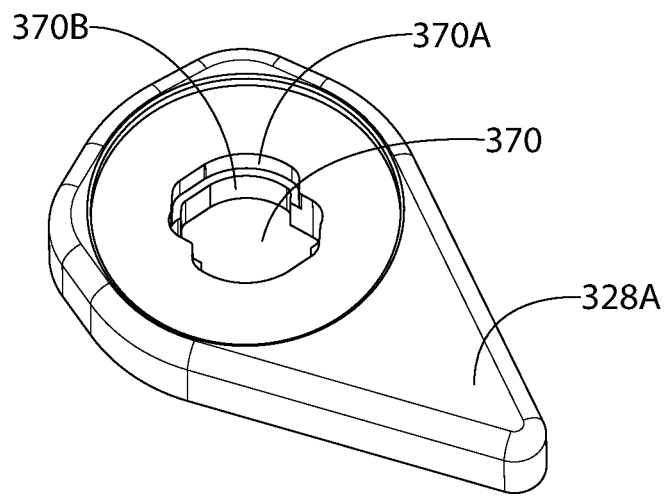
Figure 15C:
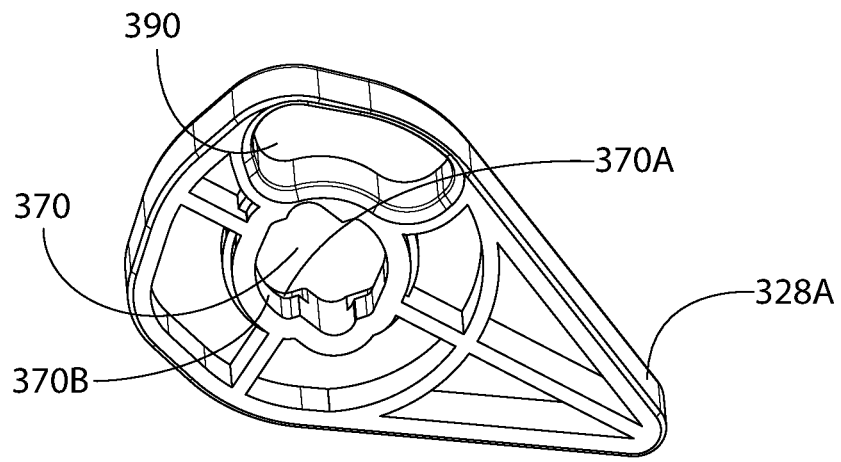
Figure 16A:
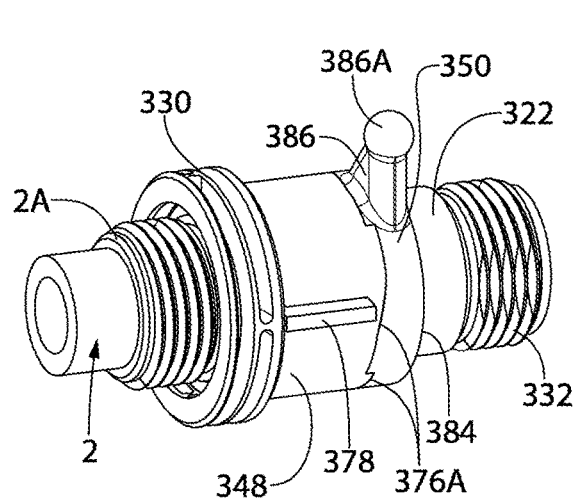
FIG. 16A is an isometric view of the externally threaded bib or spout of the faucet and various internal components (e.g., a washer, a tubular connector member having a threaded connector at one end thereof for connection to the hose, a pressure applying ring, and an actuator ring) making up the coupling device of FIG. 12A.
Figure 16B:
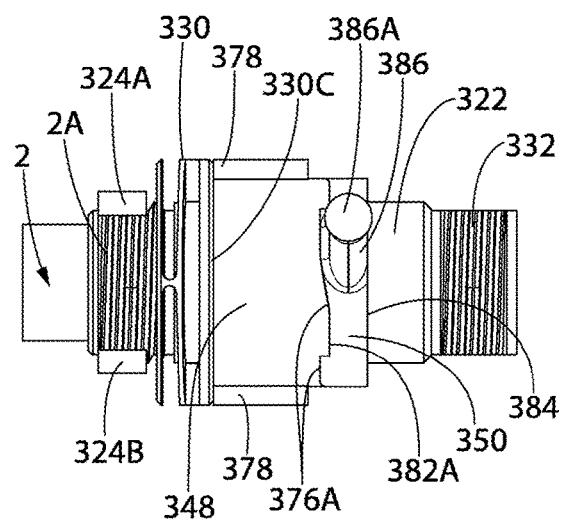
FIG. 16B is a top plan view of the components shown in FIG. 16A and also showing the clamp for releasably mounting the coupling device onto the externally threaded bib or spout of the faucet.
Figure 17:
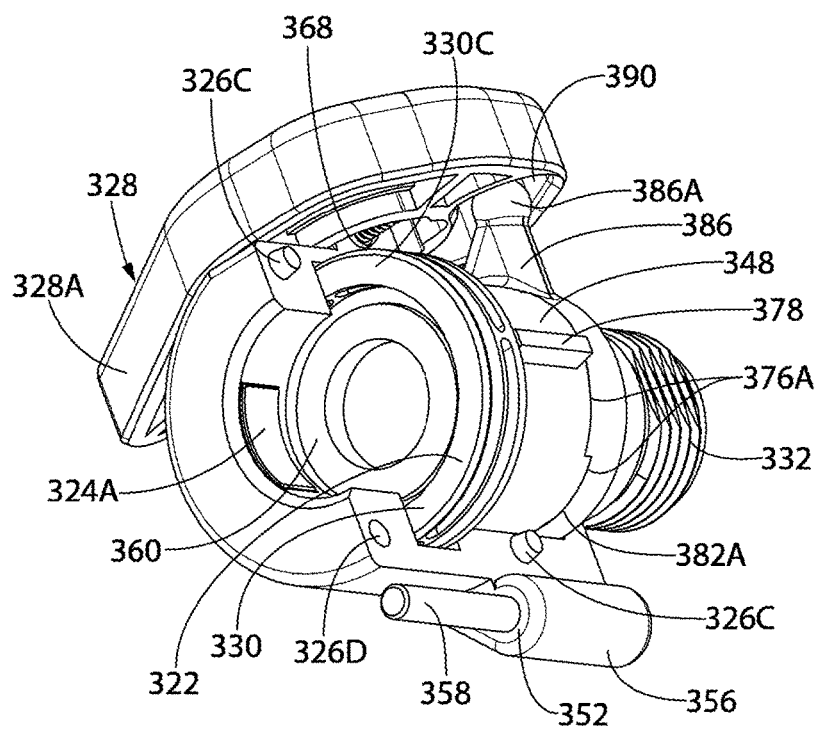
FIG. 17 is a somewhat enlarged isometric view of the components shown in FIG. 13, minus the externally threaded bib or spout of the faucet and a few other components of the coupling device of FIG. 12A.

Turning now to FIGS. 15A-15C the details of the construction of the pivotable lever 328A will now be described. Thus, as can be seen the lever is a generally triangular shaped member having a generally planar top surface having an opening 366 extending therethrough. The opening 370 includes two sections, namely, a top section 370A contiguous with the top surface of the lever, and a bottom section 370B disposed immediately below the top section 370A. Both sections are of the same general multi-lobed shape. The bottom section is of smaller cross-sectional area than the top section, but of the same general multi-lobed shape. The bottom section 370B is configured to receive the undercut portions of the two mesas 364, whereas the top section 370A is configured to receive the top portion of those mesas. The multi-lobed shape of the surfaces of the top and bottom sections of the opening 370 form cam surfaces at each section, which cam surfaces are configured to engage the respective sidewall surfaces of the mesas 364 as the actuating lever 328 is pivoted into one of those three positions. In particular, the lever serves to effect the pivoting of the clam-shell shaped members 326A and 326B from the open position or state, to the intermediate securement position or state, and then to the closed sealed position or state), when the pivotable lever 364 is rotated about a rotation axis Y (FIG. 13) from a first rotational position, to a second rotational position and then to a third rotational position, respectively.

In the first rotational position, the apex to the actuating lever points in a direction that is perpendicular to the central longitudinal axis X. In that position the two clam-shell shaped members 326A and 326B of the housing assembly are in the open position or state. Rotation of the actuating lever in the clockwise direction about the axis Y to a second rotational position, whereupon the apex of the lever points somewhat towards the externally threaded end of the tubular connector member 322, pivots the two clam-shell shaped members 326A and 326B towards each other to bring them into their intermediate securement position or state. As pointed out above when the housing assembly of the coupling device 320 is in that position or state it will be releasably secured onto the faucet (assuming, of course, that the faucet is inserted into the housing assembly). Further rotation of the actuating lever in the clockwise direction about the axis Y to the third and final position at which the apex of the lever points more directly towards the externally threaded end of the tubular connector member 322, pivots the two clam-shell shaped members 326A and 326B towards each other their closed sealing position or state wherein they are in tight engagement with each other. Pivoting the actuating lever from the third position back to the first position enables the bias of the spring 368 to effect the pivoting of the two dam-shell shaped members 326A and 326B away from other to bring them back to their open position, whereupon the coupling device 320 can be removed from the faucet 2.

Turning now to FIGS. 14, 16A, 16B, 17, 19 and 20, the details of the pressure applying ring 348 and the actuating ring 350 and how they operate to form a fluid-tight seal between the faucet and the coupling device when in the closed sealed state will now be discussed. Thus as can be seen, the pressure applying ring 348 basically comprises a short tubular section having a circular central passageway 372, a generally planar front surface 374, and a rear surface 376. The central passageway is configured to receive a portion of the tubular connector member 322, whereupon the front surface 374 of the pressure applying ring confronts the undersurface 330C of the flanged end 330 of the tubular connector member. The rear surface 376 of the ring 348 includes four identical inclined ramps, 376A, each extending for a quarter of the circumference of the ring 348. The outer surface of each ramp 376A forms a cam surface for cooperation with a correspondingly shaped cam ramp surface (to be described shortly) of the actuating ring 350. The pressure applying ring 348 also includes a pair of linear projections or rails 378 extending outward radially from an outer surface of the ring and diametrically opposed to each other. Each projection or rail extends the full length of the ring 248 between the front and rear surfaces thereof and parallel to the axis X. Each projection or rail 378 is configured for sliding receipt within a respective one of the slots 352 in a respective one of the clam-shell shaped members 326A and 326B, whereupon when the housing assembly is in its intermediate securement position the pressure applying ring 348 can be slid down the slots 352 towards the faucet 4 by the operation, i.e., rotation, of the actuating ring 350.

The actuating ring 350 basically comprises a very short tubular section having a circular central passageway 380, a front surface 382, and a planar rear surface 384. The central passageway 380 is configured to receive a portion of the tubular connector member 322, whereupon the front surface of the actuating ring engages the rear cam surface 376 of the pressure applying ring. The front surface of the actuating ring includes four identical inclined ramps, 382A, each extending for a quarter of the circumference of the ring 350 and which abut and cooperate with the cam ramp surfaces 376A of the pressure applying ring 348. The actuating ring 350 also includes a finger 386 projecting radially outward therefrom and having a bulbous free end 386A. The finger 386 extends through a linear slot 388 (FIG. 18) in the planar top surface of the two clam-shell shaped members 326A and 326B, such that the bulbous free end 386A of the finger 386 is received within an arcuate slot 390 (FIG. 15C) in the underside of the pivotable lever 328A. That arrangement enables the pivoting of the actuating lever 328A about the axis Y from its first rotational position (wherein the coupling member is in the open position) to the second rotational position (wherein the coupling device is in the intermediate securement position) to effect the rotation of the actuating ring about the longitudinal axis X. In particular, the pivoting of the actuating lever causes the bulbous free end of the finger to start to slide down the slot 390 from a point immediately adjacent one end of the slot, whereupon the intermediate portion of the finger pivots down the linear slot 388 in the housing assembly. That pivoting action results in the rotation of the actuating ring about the longitudinal axis X. The rotation of the actuating ring about the longitudinal axis X causes its cam surfaces 382A to slide along the cam surfaces 376A of the pressure applying ring 376, whereupon the pressure applying ring is slid along the longitudinal axis X guided by the projections or rails 378 within the longitudinally extending slots 352 in the clam-shell shaped members. That action brings the front surface 374 of the pressure applying ring into engagement with the undersurface 330C of the flange 330 of the tubular connector member 322, whereupon that member is slid toward the faucet, thereby carrying the washer 360 with it towards the free end surface 2B of the faucet.

Operation of the actuating assembly to bring the two clam-shell shaped members of the housing assembly from the normally open position to the intermediate securement position and from there to the closed sealing position will now be described. To that end, when the coupling device 320 is in its first or normally open position, the apex or pointed end of the pivotable lever will be facing perpendicularly to the longitudinal axis, and portion of the lobe-shaped cam surfaces of the opening 370 will be in engagement with portions of the sidewalls of the mesas 364. Pivoting the actuating lever in the clockwise direction to bring the apex of the lever to the second position which is closer to the connector 322 will cause portions of the lobe-shaped cam surfaces of the opening 370 to ride or slide over the portions of the sidewalls of the mesas against the bias of the spring 368. Such action will pull those mesas closer together whereupon they will be in their intermediate securement position. As mentioned earlier in that position the shoes 324A and 324B of the clamp 324 will tightly engage the external threads 2A on the faucet 2 to releasably secure (mount) the coupling device 320 on the faucet. Further pivoting of the lever in the clockwise direction from the second position will cause other portions of the lobe-shaped cam surfaces to engage portions of the sidewalls of the mesas pivot the two clam-shell shaped members even closer together against the bias of the spring until the two inner surfaces 364B of those mesas are in abutment. At that time the pressure applying ring will have slid the tubular connector 322 toward the faucet, whereupon the washer 360 will be tightly compressed between the annular ledge 330B of the tubular connector 322 and the free end surface 2B of the faucet, thereby resulting in a fluid-tight seal. Hence liquid exiting from the faucet can flow through the compressed washer into the passageway extending through the tubular connector 322 from whence it can flow into the hose 4.

Figure 23:
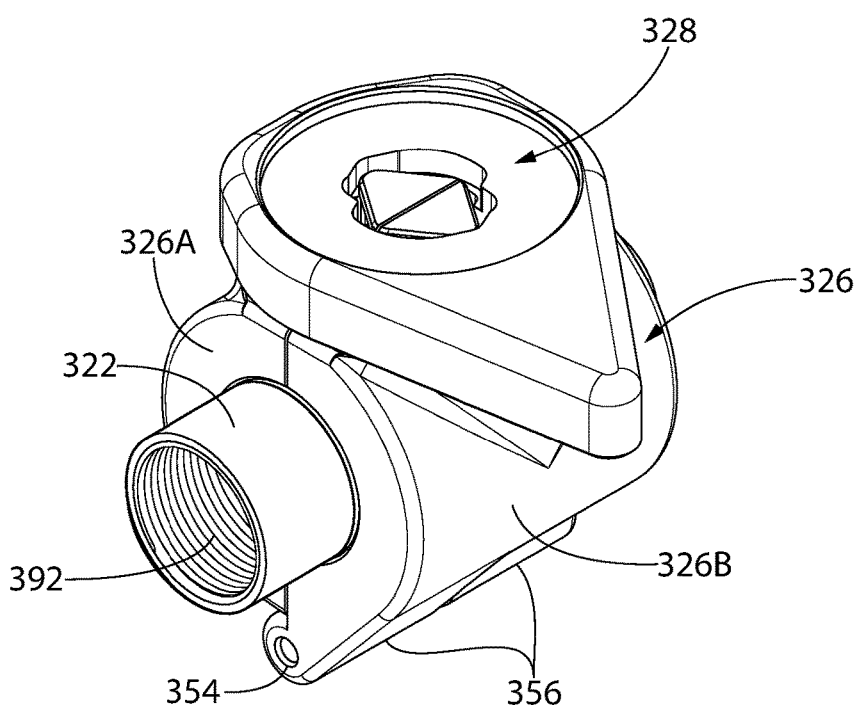
Figure 24:
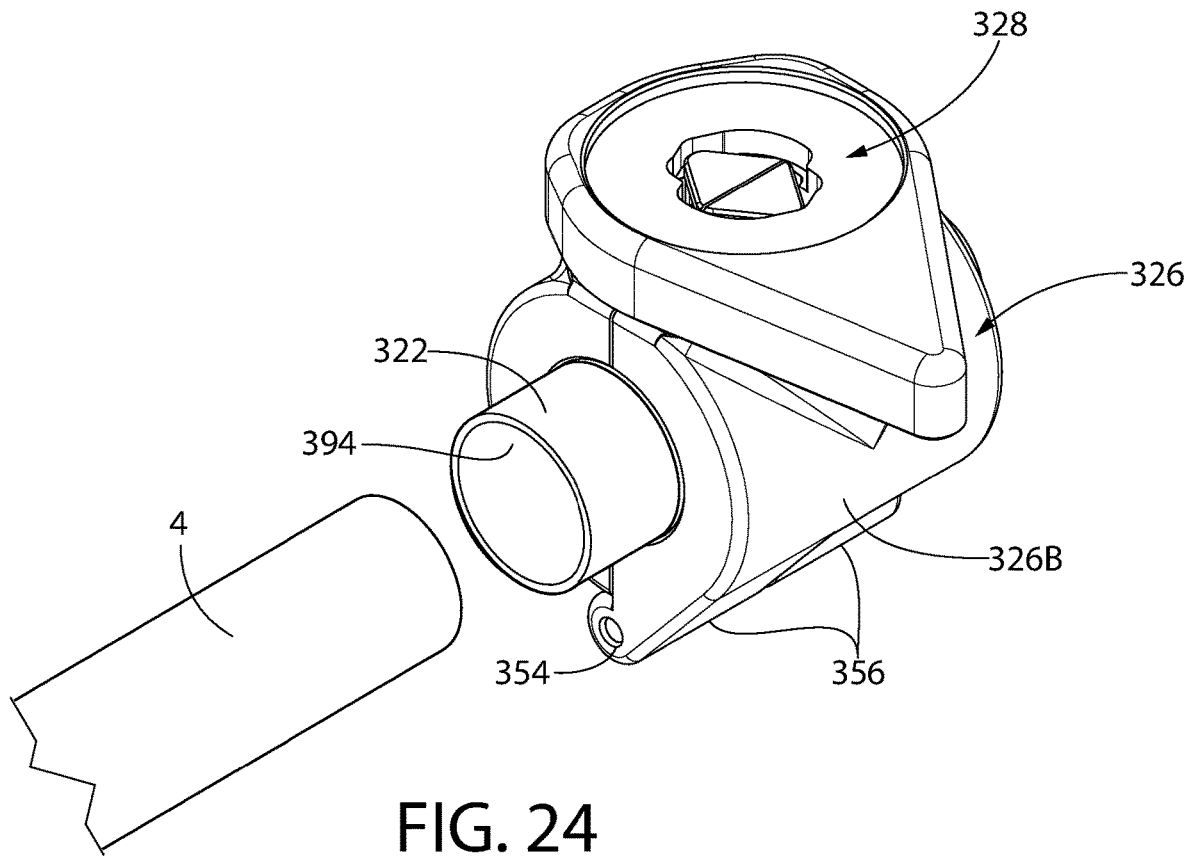
FIG. 24 is an isometric view of yet another exemplary embodiment of a coupling device constructed in accordance with this invention.

As should be appreciated by those skilled in the art, the coupling devices and the cap device as disclosed above are merely exemplary embodiments of various coupling devices or cap devices that can be constructed in accordance with this invention. For example, the tubular connector 322 of coupling device 320 may be modified to eliminate the external threads 332 and to substitute an internally threaded socket 392 as shown in FIG. 23 for those external threads. That arrangement will enable the coupling device 320 to be connected to an externally threaded male connector of a hose 4. The tubular connector 322 of the coupling device 320 can be configured so that it forms a permanent part of a hose 4 rather than merely being a device suitable for releasable connection to a hose. To that end, as shown in FIG. 24, the tubular connector 322 may be modified to eliminate the external threads 332 and to substitute a smooth walled socket 394 in communication with the central passageway in the member 322. An end of a flexible hose, e.g., a garden hose, can be fixedly secured, e.g., adhesively secured, within the socket 394, so that the coupling device forms an integral part of the hose. Many other modifications to the coupling devices of the subject invention are contemplated.

Without further elaboration the foregoing will so fully illustrate our invention that others may, by applying current or future knowledge, adopt the same for use under various conditions of service.

We claim:

1. A coupling device for releasably securing a first liquid-carrier to a second liquid-carrier, the first liquid-carrier comprising a first hose, the second liquid-carrier comprising one of a faucet or a second hose, said second liquid-carrier having an end portion terminating in a free end surface, said coupling device comprising:
a tubular connector member comprising a connector for connection to the first liquid-carrier, said tubular connector member having an engagement surface;
a clamp configured for clamping the end portion of the second liquid-carrier;
a housing assembly comprising:
a first housing member;
a second housing member pivotably connected to said first housing member and located generally opposite said first housing member, said second housing member being pivotable between an open position and a closed sealing position, and vice versa;
a washer; and
an actuating assembly comprising an actuating member coupled to said tubular connector member and to said first and second housing members to pivot said first and second housing members with respect to each other between said open position and said closed sealing position and vice versa, whereupon when said first and second housing members are in said closed sealing position said clamp tightly engages the end portion of the second liquid-carrier to releasably secure said clamp thereto, with said engagement surface of said tubular connector member compressing said washer between it and said free end surface of said second liquid-carrier, thereby resulting in the formation of a fluid-tight seal between said coupling device, the first liquid-carrier and the second liquid-carrier, said coupling device when in said open position being configured for removal from the second liquid-carrier.

2. The coupling device of claim 1, wherein said washer is interposed between said engagement surface of said tubular connector member and said free end surface of the second liquid-carrier, wherein the end portion of the second liquid carrier includes a central longitudinal axis, wherein said tubular connector member is located on said central longitudinal axis and configured to be moved in a direction parallel to said central longitudinal axis to cause said engagement surface of said tubular connector member to engage said washer to cause said washer to be tightly interposed between said engagement surface and said free end surface to thereby result said fluid-tight seal when said second housing member is in said closed sealing position.

3. The coupling device of claim 2, wherein said second housing member is also configured to be pivoted to an intermediate securement position between said open position and said closed sealing position, said coupling device being releasably secured to the second liquid-carrier when in said intermediate securement position and forming said fluid-tight seal when in said closed sealing position.

4. The coupling device of claim 3, wherein said actuating member is movable between a first position, a second position and a third position, said second housing member being in said open position when said actuating member is in said first position, said second housing member being in said intermediate securement position when said actuating member is in said second position, said second housing member being in said closed sealing position when said actuating member is in said third position.

5. The coupling device of claim 2, wherein said clamp comprises concave curved portions, wherein said first housing member comprises a cavity configured for receipt of one of said concave curved portions and said second housing member comprises a cavity configured for receipt of another of said concave curved portions.

6. The coupling device of claim 4, wherein said actuating assembly additionally comprising an actuator ring having a front cam surface, said actuator ring being configured to be rotated about said central longitudinal axis in response to the movement of said actuating member to said first, second and third positions, said front cam surface of said actuator ring being configured for engaging another cam surface to move said tubular connector member in a direction along the central longitudinal axis when said actuating member is in said third position, whereupon said engagement surface of said tubular connector member is in tight engagement with said washer to compress said washer and to form fluid-tight seal.

7. The coupling device of claim 6, wherein said pressure applying member comprises a ring having a front surface configured for engaging a surface of the tubular connector member, a rear cam surface, and a central opening through which a portion of said tubular connector member extends, wherein said front cam surface of said actuator ring is configured for engaging said rear cam surface of said pressuring applying member, and wherein said actuating member is a pivotable lever.

8. The coupling device of claim 7 wherein said actuator ring comprises a finger projecting outward therefrom and configured to slide within a slot in said pivotable lever.

9. The coupling device of claim 8 wherein said first member is a clam-shell shaped member, and said second member is a clam-shell shaped member, said first and second clam-shell shaped members being pivotably connected to each other at the bottom thereof by a hinge joint, each of said first and second clam-shell shaped members having a top portion including a cam surface, said pivotable lever including cam surfaces configured for engaging the cam surfaces of the first and second clam-shell shaped members, whereupon movement of said pivotable lever from said first position to said second position causes said first and second clam-shell shaped members to pivot toward each other about said hinge joint into said intermediate securement position, whereupon movement of said pivotable lever from said second position to said third position causes said first and second clam-shell shaped members to pivot further toward each other about said hinge joint into said closed sealing position, and whereupon movement of said pivotable lever from said third position to said first position causes said first and second clam-shell shaped members to pivot away from each other about said hinge joint into said open position, said coupling device when in said open position being removable from the faucet or first hose.

10. The coupling device of claim 9 wherein said pressure applying member includes a pair of projections extending outward radially from an outer surface of said ring and being diametrically opposed to each other, and whereupon each of said first and second clam-shell shaped members includes a linear slot extending along an inner surface thereof and parallel to the central longitudinal axis, each of said slots being configured to receive a respective one of said projections to guide said pressure applying member towards said surface of said tubular connector member to compress the washer when said pivotable lever is moved from said second position to said third position.

11. The coupling device of claim 5, wherein each of said first and second housing members is clam-shell shaped, wherein each of said concave curved portions comprises a concaved curved outer surface of a shoe formed of a resilient material, and wherein each of said first and second clam-shell shaped members includes a respective one of said cavities for receipt of a respective one of said shoes.

12. The coupling device of claim 10, wherein said clamp comprises concave curved portions, wherein said first housing member comprises a cavity configured for receipt of one of said concave curved portions and said second housing member comprises a cavity configured for receipt of another of said concave curved portions, and wherein each of said concave curved portions comprises a concaved curved outer surface of a shoe formed of a resilient material, and wherein each of said first and housing second members includes a respective one of said cavities for receipt of a respective one of said shoes.

13. The coupling device of claim 1, wherein the end portion of the second liquid-carrier includes external threads and wherein said clamp is configured to tightly engage said external threads.

14. The coupling device of claim 1 wherein said connector comprises an internally threaded socket.

15. The coupling device of claim 1 wherein said connector comprises an externally threaded sleeve.

16. The coupling device of claim 1 wherein said connector comprises a socket in which an end of the first liquid-carrier is fixedly secured.

17. A coupling device for releasably securing a first liquid-carrier to a second liquid-carrier, the first liquid-carrier comprising a first hose, the second liquid-carrier comprising one of a faucet or a second hose, said second liquid-carrier having an end portion terminating in a free end surface and external threads located adjacent said free end surface, said coupling device comprising:
a housing assembly defining a housing having a hollow interior configured from receipt of said end portion of said second-liquid carrier, said hollow interior having a longitudinal axis;
an engagement surface located within said hollow interior;
a tubular connector member located within said hollow interior and having an inner end portion to which said engagement surface is coupled and an outer end portion, said outer end portion extending out of said hollow interior and configured for connection to the first liquid-carrier, said tubular connector member being movable along said longitudinal axis within said hollow interior between an open position and a closed position and vice versa;
an elastomeric sealing ring located within said hollow interior centered on said longitudinal axis and coupled to said tubular connector;
a clamp located within said hollow interior, said clamp including plural movable members configured for movement with respect to said longitudinal axis for clamping the external threads of the second liquid-carrier when said tubular connector is in said closed position, whereupon said plural movable members tightly engage the external threads of the second liquid-carrier to releasably secure said clamp thereto and with said sealing ring being tightly interposed between the free end surface of said second liquid-carrier and said engagement surface, thereby resulting in the formation of a fluid-tight seal between said coupling device, the first liquid-carrier and the second liquid-carrier, said plural movable members of said clamp being released from engagement with the external threads when said tubular connector member is in said open position, whereupon said coupling device can be removed from the second liquid-carrier.

18. The coupling device of claim 17, wherein said device includes a manually moveable member configured when moved to a first position to releasably lock said tubular connector member in said closed position.

19. The coupling device of claim 17, wherein said device additionally comprises a spring configured to bias said tubular connector member in said open position.

20. The coupling device of claim 18, wherein said device additionally comprises a spring configured to bias said tubular connector member in said open position when said manually movable member is moved to a second position.

* * * * *